United States Patent
Yuan et al.

(10) Patent No.: US 10,560,315 B2
(45) Date of Patent: Feb. 11, 2020

(54) METHOD AND DEVICE FOR PROCESSING FAILURE IN AT LEAST ONE DISTRIBUTED CLUSTER, AND SYSTEM

(71) Applicant: Huawei Technologies Co., Ltd., Shenzhen (CN)

(72) Inventors: Jianqing Yuan, Shenzhen (CN); Shaoji Ni, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 120 days.

(21) Appl. No.: 15/674,159

(22) Filed: Aug. 10, 2017

(65) Prior Publication Data

US 2017/0339005 A1     Nov. 23, 2017

Related U.S. Application Data

(63) Continuation of application No. PCT/CN2015/084573, filed on Jul. 21, 2015.

(30) Foreign Application Priority Data

Feb. 10, 2015    (CN) .......................... 2015 1 0068053

(51) Int. Cl.
*H04L 12/24*      (2006.01)
*H04L 29/08*      (2006.01)
(Continued)

(52) U.S. Cl.
CPC .......... *H04L 41/0668* (2013.01); *H04L 29/08* (2013.01); *H04L 41/0677* (2013.01);
(Continued)

(58) Field of Classification Search
CPC . H04L 29/08; H04L 41/0663; H04L 41/0668; H04L 41/0677; H04L 43/00;
(Continued)

(56) References Cited

U.S. PATENT DOCUMENTS 6,651,242 B1   11/2003   Hebbagodi et al.
6,691,173 B2   2/2004   Morris et al.
(Continued)

FOREIGN PATENT DOCUMENTS

CN   101494565 A   7/2009
CN   101771579 A   7/2010
(Continued)

OTHER PUBLICATIONS

Machine Translation and Abstract of Chinese Publication No. CN101494565, Jul. 29, 2009, 17 pages.
(Continued)

*Primary Examiner* — Eric Nowlin
(74) *Attorney, Agent, or Firm* — Conley Rose, P.C.

(57) ABSTRACT

A method and a device for processing a failure in at least one distributed cluster, and a system, where the at least one distributed cluster includes a first distributed cluster. The first distributed cluster includes a first Master node, a first Slave node, a first reference node, and a first secondary node that serves as a backup of the first Master node. The first secondary node receives a heartbeat message that includes first indication information. The first secondary node determines, according to the first indication information, that the first reference node is disconnected from the first Master node. The first secondary node determines that the first secondary node is also disconnected from the first Master node when it is detected that a heartbeat message from the first Master node to the first secondary node is interrupted. The first secondary node determines the first Master node is faulty.

16 Claims, 12 Drawing Sheets

(51) Int. Cl.
*H04L 12/26* (2006.01)
*H04L 29/14* (2006.01)
(52) U.S. Cl.
CPC .......... *H04L 43/00* (2013.01); *H04L 43/0817* (2013.01); *H04L 43/10* (2013.01); *H04L 67/145* (2013.01); *H04L 69/40* (2013.01)
(58) Field of Classification Search
CPC . H04L 43/0817; H04L 43/10; H04L 67/1097; H04L 67/145; H04L 69/40; H04W 84/18
See application file for complete search history.

(56) References Cited

U.S. PATENT DOCUMENTS

| | | | | |
|---|---|---|---|---|
| 6,757,843 B1* | 6/2004 | Wesley | H04L 12/185 | 714/18 |
| 6,885,644 B1* | 4/2005 | Knop | H04L 41/12 | 370/235 |
| 7,389,332 B1* | 6/2008 | Muchow | H04L 12/403 | 370/254 |
| 7,421,478 B1* | 9/2008 | Muchow | G06F 9/44505 | 709/209 |
| 7,421,578 B1* | 9/2008 | Huang | H04L 63/065 | 370/254 |
| 7,461,130 B1* | 12/2008 | AbdelAziz | H04W 84/20 | 709/208 |
| 7,587,465 B1* | 9/2009 | Muchow | G06F 9/5061 | 709/208 |
| 7,593,376 B2* | 9/2009 | D'Amico | H04W 72/005 | 370/338 |
| 7,818,322 B2* | 10/2010 | Tantrum | G06F 16/35 | 707/737 |
| 7,856,480 B2* | 12/2010 | Muchow | G06F 9/44505 | 709/208 |
| 8,189,494 B2* | 5/2012 | Budampati | H04J 3/0641 | 370/254 |
| 8,194,591 B2* | 6/2012 | Dore | H04W 88/04 | 370/328 |
| 8,234,516 B2 | 7/2012 | Wang et al. | | |
| 9,450,831 B2* | 9/2016 | Soneda | H04W 40/32 | |
| 9,710,344 B1* | 7/2017 | Helmick | G06F 11/2028 | |
| 9,872,224 B2* | 1/2018 | Kang | H04W 40/244 | |
| 10,277,455 B2* | 4/2019 | Erdmann | H04L 1/1835 | |
| 10,372,565 B2* | 8/2019 | Peng | G06F 11/2025 | |
| 2004/0229621 A1* | 11/2004 | Misra | H04W 16/08 | 455/445 |
| 2005/0044211 A1* | 2/2005 | Adhikari | H04L 69/40 | 709/224 |
| 2005/0086469 A1* | 4/2005 | Dunagan | H04L 12/1854 | 713/163 |
| 2007/0043726 A1* | 2/2007 | Chan | G06F 11/2033 | |
| 2007/0053309 A1* | 3/2007 | Poojary | H04L 45/22 | 370/256 |
| 2007/0127421 A1* | 6/2007 | D'Amico | H04W 72/005 | 370/338 |
| 2008/0281938 A1* | 11/2008 | Rai | G06F 15/177 | 709/209 |
| 2008/0288607 A1* | 11/2008 | Muchow | G06F 9/44505 | 709/209 |
| 2009/0216780 A1* | 8/2009 | Tantrum | G06F 16/35 | |
| 2009/0225698 A1* | 9/2009 | Dore | H04W 88/04 | 370/328 |
| 2009/0290511 A1* | 11/2009 | Budampati | H04J 3/0641 | 370/254 |
| 2009/0290572 A1* | 11/2009 | Gonia | H04J 3/0641 | 370/350 |
| 2010/0325110 A1* | 12/2010 | Tantrum | G06F 16/35 | 707/737 |
| 2010/0332564 A1* | 12/2010 | Tantrum | G06F 16/35 | 707/828 |
| 2011/0161405 A1 | 6/2011 | He | | |
| 2014/0046998 A1* | 2/2014 | Dain | G06F 9/5061 | 709/201 |
| 2014/0181035 A1* | 6/2014 | Moue | G06F 16/2255 | 707/647 |
| 2014/0211659 A1* | 7/2014 | Abraham | H04W 52/0209 | 370/254 |
| 2014/0293992 A1* | 10/2014 | Abraham | H04W 52/0225 | 370/350 |
| 2014/0297845 A1* | 10/2014 | Tamura | H04L 43/10 | 709/224 |
| 2014/0310410 A1* | 10/2014 | Ganapathy | H04L 43/0817 | 709/224 |
| 2014/0313966 A1* | 10/2014 | Shukla | H04W 48/10 | 370/312 |
| 2014/0341073 A1* | 11/2014 | Abraham | H04W 48/18 | 370/254 |
| 2015/0023214 A1* | 1/2015 | Soneda | H04W 40/32 | 370/254 |
| 2015/0081840 A1* | 3/2015 | Patil | H04L 67/28 | 709/217 |
| 2015/0131529 A1* | 5/2015 | Zhou | H04W 84/18 | 370/328 |
| 2016/0135122 A1* | 5/2016 | Abraham | H04W 52/02 | 370/311 |
| 2016/0286461 A1* | 9/2016 | Patil | H04W 40/32 | |
| 2016/0286476 A1* | 9/2016 | Patil | H04W 40/32 | |
| 2016/0301563 A1* | 10/2016 | Erdmann | H04L 1/1835 | |
| 2016/0366578 A1* | 12/2016 | Abraham | H04W 8/005 | |
| 2017/0111846 A1* | 4/2017 | Kang | H04W 40/244 | |
| 2017/0331696 A1* | 11/2017 | Gupta | H04L 43/0864 | |
| 2017/0364423 A1* | 12/2017 | Peng | G06F 11/203 | |
| 2018/0077656 A1* | 3/2018 | Hebron | H04L 41/0806 | |
| 2018/0115456 A1* | 4/2018 | Bendre | H04L 41/0663 | |
| 2018/0139276 A1* | 5/2018 | Raghupathy | H04L 67/1061 | |
| 2018/0249432 A1* | 8/2018 | Kurian | H04W 56/002 | |
| 2019/0310924 A1* | 10/2019 | Peng | G06F 11/203 | |

FOREIGN PATENT DOCUMENTS

| | | |
|---|---|---|
| CN | 102752093 A | 10/2012 |
| CN | 103117901 A | 5/2013 |
| CN | 103500140 A | 1/2014 |
| CN | 104320311 A | 1/2015 |

OTHER PUBLICATIONS

Machine Translation and Abstract of Chinese Publication No. CN102752093, Oct. 24, 2012, 22 pages.
Machine Translation and Abstract of Chinese Publication No. CN103117901, May 22, 2013, 43 pages.
Machine Translation and Abstract of Chinese Publication No. CN103500140, Jan. 8, 2014, 7 pages.
Foreign Communication From a Counterpart Application, PCT Application No. PCT/CN2015/084573, English Translation of International Search Report dated Nov. 10, 2015, 2 pages.
Foreign Communication From a Counterpart Application, PCT Application No. PCT/CN2015/084573, English Translation of Written Opinion dated Nov. 10, 2015, 7 pages.
Foreign Communication From a Counterpart Application, European Application No. 15881740.3, Extended European Search Report dated Jan. 26, 2018, 10 pages.
Machine Translation and Abstract of Chinese Publication No. CN101771579, Jul. 7, 2010, 9 pages.
Machine Translation and Abstract of Chinese Publication No. CN104320311, Jan. 28, 2015, 10 pages.
Foreign Communication From a Counterpart Application, Chinese Application No. 201510068053.1, Chinese Office Action dated Aug. 3, 2018, 7 pages.
Foreign Communication From a Counterpart Application, Chinese Application No. 201510068053.1, Chinese Search Report dated Jul. 25, 2018, 2 pages.
Foreign Communication From a Counterpart Application, European Application No. 15881740.3, European Office Action dated Apr. 2, 2019, 8 pages.

* cited by examiner

METHOD AND DEVICE FOR PROCESSING FAILURE IN AT LEAST ONE DISTRIBUTED CLUSTER, AND SYSTEM

CROSS-REFERENCE TO RELATED APPLICATIONS

This application is a continuation of International Patent Application No. PCT/CN2015/084573 filed on Jul. 21, 2015, which claims priority to Chinese Patent Application No. 201510068053.1 filed on Feb. 10, 2015. The disclosures of the aforementioned applications are hereby incorporated by reference in their entireties.

TECHNICAL FIELD

Embodiments of the present disclosure relate to the cluster management field, and in particular, to a method and a device for processing a failure in at least one distributed cluster, and a system.

BACKGROUND

Currently, most high availability (HA) distributed clusters are generally centralized with one master (a Master node) and multiple slaves (Slave nodes). A Master node sends a heartbeat message to all Slave nodes in a cluster, and each Slave node in the cluster also sends a heartbeat message to the Master node. The Slave node performs detection on the heartbeat message sent by the Master node to determine whether the Master node is faulty. The Master node performs detection on the heartbeat message sent by the Slave node to determine whether the Salve node is faulty.

However, the foregoing failure detection has the following disadvantage. Generally, only when the Slave node determines for multiple times that no heartbeat message is received from the Master node, the Salve node may consider that the Master node is faulty, and then initiate an election policy that is used for determining a new Master node in the cluster. Therefore, in other approaches, a time for failure detection performed on a Master node is excessively long.

SUMMARY

Embodiments of the present disclosure provide a method and a device for processing a failure in at least one distributed cluster, and a system, which can effectively shorten a failure detection time.

A first aspect provides a method for processing a failure in at least one distributed cluster, where the at least one distributed cluster includes a first distributed cluster, the first distributed cluster includes a first Master node and a first Slave node, the first distributed cluster further includes a first reference node and a first secondary node that serves as a backup of the first Master node, and the method includes receiving, by the first secondary node, a heartbeat message sent by the first reference node, where the heartbeat message includes first indication information that is used to indicate that the first reference node is disconnected from the first Master node, determining, by the first secondary node according to the first indication information, that the first reference node is disconnected from the first Master node, detecting, by the first secondary node, whether a heartbeat message sent by the first Master node to the first secondary node is interrupted, determining, by the first secondary node, that the first secondary node is also disconnected from the first Master node when it is detected that the heartbeat message sent by the first Master node to the first secondary node is interrupted, and determining, by the first secondary node, that the first Master node that is disconnected from both the first secondary node and the first reference node is faulty.

With reference to the first aspect, in a first possible implementation manner of the first aspect, when the first Master node is faulty, the method further includes sending, by the first secondary node, a broadcast message to all nodes in the first distributed cluster, where the broadcast message is used to indicate that the first secondary node is upgraded to a new Master node.

With reference to the first aspect or the first possible implementation manner of the first aspect, in a second possible implementation manner of the first aspect, detecting, by the first secondary node, whether a heartbeat message sent by the first Master node to the first secondary node is interrupted includes detecting, by the first secondary node, whether a heartbeat message sent by the first Master node is received between a first moment and a second moment, where the first moment is a moment at which the first secondary node receives the heartbeat message that is sent by the first reference node and that includes the first indication information, the second moment is earlier than the first moment, and a time interval between the first moment and the second moment is N times a heartbeat period of sending a heartbeat message by the first Master node to the first secondary node, where N is a positive integer.

With reference to the first aspect, or the first or the second possible implementation manner of the first aspect, in a third possible implementation manner of the first aspect, the at least one distributed cluster further includes a second distributed cluster, the second distributed cluster includes a second Master node, a second Slave node, a second reference node, and a second secondary node that serves as a backup of the second Master node, and the method further includes receiving, by the first secondary node, a heartbeat message sent by the second reference node, where the heartbeat message includes second indication information that is used to indicate that a node attribute of a receive end of the heartbeat message is a Slave node, the second reference node is configured to separately send the heartbeat message that includes the second indication information to the second Slave node and all the nodes in the first distributed cluster, and the second distributed cluster and the first distributed cluster have a same cluster identifier, determining, by the first secondary node according to the second indication information, that the node attribute that is of the receive end of the heartbeat message and that is indicated in the heartbeat message sent by the second reference node does not match a node attribute of the first secondary node, and determining that the second distributed cluster in which the second reference node is located and the first distributed cluster in which the first secondary node is located are two sub-clusters formed after one network distributed cluster is split, and negotiating, by the first secondary node, with the second secondary node in the second distributed cluster, to integrate the first distributed cluster and the second distributed cluster.

With reference to the third possible implementation manner of the first aspect, in a fourth possible implementation manner of the first aspect, negotiating, by the first secondary node, with the second secondary node in the second distributed cluster includes sending, by the first secondary node to all nodes in the first distributed cluster and the second distributed cluster, a broadcast message that is used to indicate that the node attribute of the first secondary node is a secondary node, receiving, by the first secondary node, a negotiation message sent by the second secondary node, where the negotiation message includes information that is used to indicate a weight of the second secondary node, and the negotiation message is sent by the second secondary node to the first secondary node when it is detected that the node attribute indicated in the broadcast message is the same as a node attribute of the second secondary node, and sending, by the first secondary node to the second secondary node, a negotiation response message that is used to instruct to downgrade the second secondary node to a Slave node when a weight of the first secondary node is greater than or equal to the weight of the second secondary node, or sending, by the first secondary node to all the nodes in the first distributed cluster and the second distributed cluster, a broadcast message that is used to indicate that the first secondary node is downgraded to a Slave node when a weight of the first secondary node is less than the weight of the second secondary node.

A second aspect provides a method for processing a failure in at least one distributed cluster, where the at least one distributed cluster includes a first distributed cluster, the first distributed cluster includes a first Master node and a first Slave node, the first distributed cluster further includes a first reference node and a first secondary node that serves as a backup of the first Master node, and the method includes receiving, by the first Master node, a heartbeat message sent by the first secondary node, where the heartbeat message includes third indication information that is used to indicate that the first secondary node is disconnected from the first Slave node, determining, by the first Master node according to the third indication information, that the first secondary node is disconnected from the first Slave node, detecting, by the first Master node, whether a heartbeat message sent by the first Slave node to the first Master node is interrupted, determining, by the first Master node, that the first Master node is also disconnected from the first Slave node when it is detected that the heartbeat message sent by the first Slave node to the first Master node is interrupted, and determining, by the first Master node, that the first Slave node that is disconnected from both the first Master node and the first secondary node is faulty.

With reference to the second aspect, in a first possible implementation manner of the second aspect, detecting, by the first Master node, whether a heartbeat message sent by the first Slave node to the first Master node is interrupted includes detecting, by the first Master node, whether a heartbeat message sent by the first Slave node is received between a third moment and a fourth moment, where the third moment is a moment at which the first Master node receives the heartbeat message that is sent by the first secondary node and that includes the third indication information, the fourth moment is earlier than the third moment, and a time interval between the third moment and the fourth moment is N times a heartbeat period of sending a heartbeat message by the first Slave node to the first Master node, where N is a positive integer.

With reference to the second aspect or the first possible implementation manner of the second aspect, in a second possible implementation manner of the second aspect, the method further includes detecting, within a preset detection period by the first Master node, whether a heartbeat message sent by the first secondary node and a heartbeat message sent by the first reference node are received, where the preset detection period is M times the heartbeat period of sending a heartbeat message, and M is a positive integer, and determining, by the first Master node, that both the first secondary node and the first reference node are faulty when neither a heartbeat message sent by the first secondary node nor a heartbeat message sent by the first reference node is received within the preset detection period.

With reference to the second aspect, or the first or the second possible implementation manner of the second aspect, in a third possible implementation manner of the second aspect, the at least one distributed cluster further includes a second distributed cluster, the second distributed cluster includes a second Master node, a second Slave node, a second reference node, and a second secondary node that serves as a backup of the second Master node, and the method further includes receiving, by the first Master node, a heartbeat message sent by the second reference node, where the heartbeat message includes fourth indication information that is used to indicate that a node attribute of a receive end of the heartbeat message is a Slave node, the second reference node is configured to separately send the heartbeat message that includes the fourth indication information to the second Slave node and all nodes in the first distributed cluster, and the second distributed cluster and the first distributed cluster have a same cluster identifier, determining, by the first Master node according to the fourth indication information, that the node attribute that is of the receive end of the heartbeat message and that is indicated in the heartbeat message sent by the second reference node does not match a node attribute of the first Master node, and determining that the second distributed cluster in which the second reference node is located and the first distributed cluster in which the first Master node is located are two sub-clusters formed after one network distributed cluster is split, and negotiating, by the first Master node, with the second Master node in the second distributed cluster to integrate the first distributed cluster and the second distributed cluster.

With reference to the third possible implementation manner of the second aspect, in a fourth possible implementation manner of the second aspect, negotiating, by the first Master node, with the second Master node in the second distributed cluster includes sending, by the first Master node to all nodes in the first distributed cluster and the second distributed cluster, a broadcast message that is used to indicate that the node attribute of the first Master node is a Master node, receiving, by the first Master node, a negotiation message sent by the second Master node, where the negotiation message includes information that is used to indicate a weight of the second Master node, and the negotiation message is sent by the second Master node to the first Master node when it is detected that the node attribute indicated in the broadcast message is the same as a node attribute of the second Master node, and sending, by the first Master node to the second Master node, a negotiation response message that is used to instruct to downgrade the second Master node to a Slave node when a weight of the first Master node is greater than or equal to the weight of the second Master node, or sending, by the first Master node to all the nodes in the first distributed cluster and the second distributed cluster, a broadcast message that is used to indicate that the first Master node is downgraded to a Slave node when a weight of the first Master node is less than the weight of the second Master node.

A third aspect provides a device for processing a failure in at least one distributed cluster, where the at least one distributed cluster includes a first distributed cluster, the first distributed cluster includes a first Master node and a first Slave node, the first distributed cluster further includes a first reference node and a first secondary node that serves as a backup of the first Master node, and the first reference node is configured to send a heartbeat message to the first secondary node when it is detected that a heartbeat message sent by the first Master node to the first reference node is interrupted, where the heartbeat message includes first indication information that is used to indicate that the first reference node is disconnected from the first Master node, the device is the first secondary node, and the device includes a first receiving module configured to receive the heartbeat message that is sent by the first reference node and that includes the first indication information, a first determining module configured to determine, according to the first indication information received by the first receiving module, that the first reference node is disconnected from the first Master node, a detection module configured to detect whether a heartbeat message sent by the first Master node to the device is interrupted, a second determining module configured to determine that the device is also disconnected from the first Master node when the detection module detects that the heartbeat message sent by the first Master node to the device is interrupted, and a third determining module configured to determine, according to results of the determining by the first determining module and the second determining module, that the first Master node is faulty.

With reference to the third aspect, in a first possible implementation manner of the third aspect, the device further includes a sending module configured to send a broadcast message to all nodes in the first distributed cluster when the third determining module determines that the first Master node is faulty, where the broadcast message is used to indicate that the device is upgraded to a new Master node.

With reference to the third aspect or the first possible implementation manner of the third aspect, in a second possible implementation manner of the third aspect, the detection module is further configured to detect whether a heartbeat message sent by the first Master node is received between a first moment and a second moment, where the first moment is a moment at which the device receives the heartbeat message that is sent by the first reference node and that includes the first indication information, the second moment is earlier than the first moment, and a time interval between the first moment and the second moment is N times a heartbeat period of sending a heartbeat message by the first Master node to the device, where N is a positive integer.

With reference to the third aspect, or the first or the second possible implementation manner of the third aspect, in a third possible implementation manner of the third aspect, the at least one distributed cluster further includes a second distributed cluster, the second distributed cluster includes a second Master node, a second Slave node, a second reference node, and a second secondary node that serves as a backup of the second Master node, and the device further includes a second receiving module configured to receive a heartbeat message sent by the second reference node, where the heartbeat message includes second indication information that is used to indicate that a node attribute of a receive end of the heartbeat message is a Slave node, the second reference node is configured to separately send the heartbeat message that includes the second indication information to the second Slave node and all the nodes in the first distributed cluster, and the second distributed cluster and the first distributed cluster have a same cluster identifier, a fourth determining module configured to determine, according to the second indication information received by the second receiving module, that the node attribute that is of the receive end of the heartbeat message and that is indicated in the heartbeat message sent by the second reference node does not match a node attribute of the device, and determine that the second distributed cluster in which the second reference node is located and the first distributed cluster in which the device is located are two sub-clusters formed after one network distributed cluster is split, and a negotiation module configured to negotiate with the second secondary node in the second distributed cluster to integrate the first distributed cluster and the second distributed cluster.

With reference to the third possible implementation manner of the third aspect, in a fourth possible implementation manner of the third aspect, the negotiation module includes a first sending unit configured to send, to all nodes in the first distributed cluster and the second distributed cluster, a broadcast message that is used to indicate that the node attribute of the device is a secondary node, a receiving unit configured to receive a negotiation message sent by the second secondary node, where the negotiation message includes information that is used to indicate a weight of the second secondary node, and the negotiation message is sent by the second secondary node to the device when it is detected that the node attribute indicated in the broadcast message sent by the first sending unit is the same as a node attribute of the second secondary node, a second sending unit configured to send, to the second secondary node, a negotiation response message that is used to instruct to downgrade the second secondary node to a Slave node when a weight of the device is greater than or equal to the weight of the second secondary node, and a third sending unit configured to send, to all the nodes in the first distributed cluster and the second distributed cluster, a broadcast message that is used to indicate that the device is downgraded to a Slave node when a weight of the device is less than the weight of the second secondary node.

A fourth aspect provides a device for processing a failure in at least one distributed cluster, where the at least one distributed cluster includes a first distributed cluster, the first distributed cluster includes a first Master node and a first Slave node, the first distributed cluster further includes a first reference node and a first secondary node that serves as a backup of the first Master node, and the first secondary node is configured to send a heartbeat message to the first Master node when it is detected that a heartbeat message sent by the first Slave node to the first secondary node is interrupted, where the heartbeat message includes third indication information that is used to indicate that the first secondary node is disconnected from the first Slave node, the device is the first Master node, and the device includes a first receiving module configured to receive the heartbeat message that is sent by the first secondary node and that includes the third indication information, a first determining module configured to determine, according to the third indication information received by the first receiving module, that the first secondary node is disconnected from the first Slave node, a first detection module configured to detect whether a heartbeat message sent by the first Slave node to the device is interrupted, a second determining module configured to determine that the device is also disconnected from the first Slave node when the first detection module detects that the heartbeat message sent by the first Slave node to the device is interrupted, and a third determining module configured to determine, according to results of the determining by the first determining module and the second determining module, that the first Slave node is faulty.

With reference to the fourth aspect, in a first possible implementation manner of the fourth aspect, the first detection module is further configured to detect whether a heartbeat message sent by the first Slave node is received between a third moment and a fourth moment, where the third moment is a moment at which the device receives the heartbeat message that is sent by the first secondary node and that includes the third indication information, the fourth moment is earlier than the third moment, and a time interval between the third moment and the fourth moment is N times a heartbeat period of sending a heartbeat message by the first Slave node to the device, where N is a positive integer.

With reference to the fourth aspect or the first possible implementation manner of the fourth aspect, in a second possible implementation manner of the fourth aspect, the device further includes a second detection module configured to detect, within a preset detection period, whether a heartbeat message sent by the first secondary node and a heartbeat message sent by the first reference node are received, where the preset detection period is M times the heartbeat period of sending a heartbeat message, and M is a positive integer, and a fourth determining module configured to determine that both the first secondary node and the first reference node are faulty when neither a heartbeat message sent by the first secondary node nor a heartbeat message sent by the first reference node is received by the second detection module within the preset detection period.

With reference to the fourth aspect, or the first or the second possible implementation manner of the fourth aspect, in a third possible implementation manner of the fourth aspect, the at least one distributed cluster further includes a second distributed cluster, the second distributed cluster includes a second Master node, a second Slave node, a second reference node, and a second secondary node that serves as a backup of the second Master node, and the device further includes a second receiving module configured to receive a heartbeat message sent by the second reference node, where the heartbeat message includes fourth indication information that is used to indicate that a node attribute of a receive end of the heartbeat message is a Slave node, the second reference node is configured to separately send the heartbeat message that includes the fourth indication information to the second Slave node and all nodes in the first distributed cluster, and the second distributed cluster and the first distributed cluster have a same cluster identifier, a fifth determining module configured to determine, according to the fourth indication information received by the second receiving module, that the node attribute that is of the receive end of the heartbeat message and that is indicated in the heartbeat message sent by the second reference node does not match a node attribute of the device, and determine that the second distributed cluster in which the second reference node is located and the first distributed cluster in which the device is located are two sub-clusters formed after one network distributed cluster is split, and a negotiation module configured to negotiate with the second Master node in the second distributed cluster to integrate the first distributed cluster and the second distributed cluster.

With reference to the third possible implementation manner of the fourth aspect, in a fourth possible implementation manner of the fourth aspect, the negotiation module includes a first sending unit configured to send, to all nodes in the first distributed cluster and the second distributed cluster, a broadcast message that is used to indicate that the node attribute of the device is a Master node, a receiving unit configured to receive a negotiation message sent by the second Master node, where the negotiation message includes information that is used to indicate a weight of the second Master node, and the negotiation message is sent by the second Master node to the device when it is detected that the node attribute indicated in the broadcast message sent by the first sending unit is the same as a node attribute of the second Master node, a second sending unit configured to send, to the second Master node, a negotiation response message that is used to instruct to downgrade the second Master node to a Slave node when a weight of the device is greater than or equal to the weight of the second Master node, and a third sending unit configured to send, to all the nodes in the first distributed cluster and the second distributed cluster, a broadcast message that is used to indicate that the device is downgraded to a Slave node when a weight of the device is less than the weight of the second Master node.

A fifth aspect provides a distributed cluster system, where the distributed cluster system includes a first distributed cluster, the first distributed cluster includes a first Master node and a first Slave node, the first distributed cluster further includes a first reference node and a first secondary node that serves as a backup of the first Master node, the first Master node, the first secondary node, and the first reference node are configured to send a heartbeat message to each other, the first reference node is further configured to send a heartbeat message to the first Slave node, and the first Slave node is configured to separately send a heartbeat message to the first Master node and the first secondary node, where the first reference node is further configured to send a heartbeat message to the first secondary node when it is detected that the heartbeat message sent by the first Master node to the first reference node is interrupted, where the heartbeat message includes first indication information that is used to indicate that the first reference node is disconnected from the first Master node, and the first secondary node includes a first receiving module configured to receive the heartbeat message that is sent by the first reference node and that includes the first indication information, a first determining module configured to determine, according to the first indication information received by the first receiving module, that the first reference node is disconnected from the first Master node, a detection module configured to detect whether a heartbeat message sent by the first Master node to the first secondary node is interrupted, a second determining module configured to determine that the first secondary node is also disconnected from the first Master node when the detection module detects that the heartbeat message sent by the first Master node to the first secondary node is interrupted, and a third determining module configured to determine, according to results of the determining by the first determining module and the second determining module, that the first Master node is faulty.

With reference to the fifth aspect, in a first possible implementation manner of the fifth aspect, the first secondary device further includes a sending module configured to send a broadcast message to all nodes in the first distributed cluster when the third determining module determines that the first Master node is faulty, where the broadcast message is used to indicate that the first secondary node is upgraded to a new first Master node.

With reference to the fifth aspect or the first possible implementation manner of the fifth aspect, in a second possible implementation manner of the fifth aspect, the detection module is further configured to detect whether a heartbeat message sent by the first Master node is received between a first moment and a second moment, where the first moment is a moment at which the first secondary node receives the heartbeat message that is sent by the first reference node and that includes the first indication information, the second moment is earlier than the first moment, and a time interval between the first moment and the second moment is N times a heartbeat period of sending a heartbeat message by the first Master node to the first secondary node, where N is a positive integer.

With reference to the fifth aspect, or the first or the second possible implementation manner of the fifth aspect, in a third possible implementation manner of the fifth aspect, the distributed cluster system further includes a second distributed cluster, the second distributed cluster includes a second Master node, a second Slave node, a second reference node, and a second secondary node that serves as a backup of the second Master node, and the first secondary node further includes a second receiving module configured to receive a heartbeat message sent by the second reference node, where the heartbeat message includes second indication information that is used to indicate that a node attribute of a receive end of the heartbeat message is a Slave node, the second reference node is configured to separately send the heartbeat message that includes the second indication information to the second Slave node and all the nodes in the first distributed cluster, and the second distributed cluster and the first distributed cluster have a same cluster identifier, a fourth determining module configured to determine, according to the second indication information received by the second receiving module, that the node attribute that is of the receive end of the heartbeat message and that is indicated in the heartbeat message sent by the second reference node does not match a node attribute of the first secondary node, and determine that the second distributed cluster in which the second reference node is located and the first distributed cluster in which the first secondary node is located are two sub-clusters formed after one network distributed cluster is split, and a negotiation module configured to negotiate with the second secondary node in the second distributed cluster to integrate the first distributed cluster and the second distributed cluster.

With reference to the third possible implementation manner of the fifth aspect, in a fourth possible implementation manner of the fifth aspect, the negotiation module includes a first sending unit configured to send, to all nodes in the first distributed cluster and the second distributed cluster, a broadcast message that is used to indicate that the node attribute of the first secondary node is a secondary node, a receiving unit configured to receive a negotiation message sent by the second secondary node, where the negotiation message includes information that is used to indicate a weight of the second secondary node, and the negotiation message is sent by the second secondary node to the device when it is detected that the node attribute indicated in the broadcast message sent by the first sending unit is the same as a node attribute of the second secondary node, a second sending unit configured to send, to the second secondary node, a negotiation response message that is used to instruct to downgrade the second secondary node to a Slave node when a weight of the first secondary node is greater than or equal to the weight of the second secondary node, and a third sending unit configured to send, to all the nodes in the first distributed cluster and the second distributed cluster, a broadcast message that is used to indicate that the first secondary node is downgraded to a Slave node when a weight of the first secondary node is less than the weight of the second secondary node.

A sixth aspect provides a distributed cluster system, where the distributed cluster system includes a first distributed cluster, the first distributed cluster includes a first Master node and a first Slave node, the first distributed cluster further includes a first reference node and a first secondary node that serves as a backup of the first Master node, the first Master node, the first secondary node, and the first reference node are configured to send a heartbeat message to each other, the first reference node is further configured to send a heartbeat message to the first Slave node, and the first Slave node is configured to separately send a heartbeat message to the first Master node and the first secondary node, where the first secondary node is further configured to send a heartbeat message to the first Master node when it is detected that the heartbeat message sent by the first Slave node to the first secondary node is interrupted, where the heartbeat message includes third indication information that is used to indicate that the first secondary node is disconnected from the first Slave node, and the first Master node includes a first receiving module configured to receive the heartbeat message that is sent by the first secondary node and that includes the third indication information, a first determining module configured to determine, according to the third indication information received by the first receiving module, that the first secondary node is disconnected from the first Slave node, a first detection module configured to detect whether a heartbeat message sent by the first Slave node to the first Master node is interrupted, a second determining module configured to determine that the first Master node is also disconnected from the first Slave node when the first detection module detects that the heartbeat message sent by the first Slave node to the first Master node is interrupted, and a third determining module configured to determine, according to results of the determining by the first determining module and the second determining module, that the first Slave node is faulty.

With reference to the sixth aspect, in a first possible implementation manner of the sixth aspect, the first detection module is further configured to detect whether a heartbeat message sent by the first Slave node is received between a third moment and a fourth moment, where the third moment is a moment at which the first Master node receives the heartbeat message that is sent by the first secondary node and that includes the third indication information, the fourth moment is earlier than the third moment, and a time interval between the third moment and the fourth moment is N times a heartbeat period of sending a heartbeat message by the first Slave node to the first Master node, where N is a positive integer.

With reference to the sixth aspect or the first possible implementation manner of the sixth aspect, in a second possible implementation manner of the sixth aspect, the first Master node further includes a second detection module configured to detect, within a preset detection period, whether a heartbeat message sent by the first secondary node and a heartbeat message sent by the first reference node are received, where the preset detection period is M times the heartbeat period of sending a heartbeat message, and M is a positive integer, and a fourth determining module configured to determine that both the first secondary node and the first reference node are faulty when neither a heartbeat message sent by the first secondary node nor a heartbeat message sent by the first reference node is received by the second detection module within the preset detection period.

With reference to the sixth aspect, or the first or the second possible implementation manner of the sixth aspect, in a third possible implementation manner of the sixth aspect, the distributed cluster system further includes a second distributed cluster, the second distributed cluster includes a second Master node, a second Slave node, a second reference node, and a second secondary node that serves as a backup of the second Master node, and the first Master node further includes a second receiving module configured to receive a heartbeat message sent by the second reference node, where the heartbeat message includes fourth indication information that is used to indicate that a node attribute of a receive end of the heartbeat message is a Slave node, the second reference node is configured to separately send the heartbeat message that includes the fourth indication information to the second Slave node and all nodes in the first distributed cluster, and the second distributed cluster and the first distributed cluster have a same cluster identifier, a fifth determining module configured to determine, according to the fourth indication information received by the second receiving module, that the node attribute that is of the receive end of the heartbeat message and that is indicated in the heartbeat message sent by the second reference node does not match a node attribute of the first Master node, and determine that the second distributed cluster in which the second reference node is located and the first distributed cluster in which the first Master node is located are two sub-clusters formed after one network distributed cluster is split, and a negotiation module configured to negotiate with the second Master node in the second distributed cluster to integrate the first distributed cluster and the second distributed cluster.

With reference to the third possible implementation manner of the sixth aspect, in a fourth possible implementation manner of the sixth aspect, the negotiation module includes a first sending unit configured to send, to all nodes in the first distributed cluster and the second distributed cluster, a broadcast message that is used to indicate that the node attribute of the first Master node is a Master node, a receiving unit configured to receive a negotiation message sent by the second Master node, where the negotiation message includes information that is used to indicate a weight of the second Master node, and the negotiation message is sent by the second Master node to the first Master node when it is detected that the node attribute indicated in the broadcast message sent by the first sending unit is the same as a node attribute of the second Master node, a second sending unit configured to send, to the second Master node, a negotiation response message that is used to instruct to downgrade the second Master node to a Slave node when a weight of the first Master node is greater than or equal to the weight of the second Master node, and a third sending unit configured to send, to all the nodes in the first distributed cluster and the second distributed cluster, a broadcast message that is used to indicate that the first Master node is downgraded to a Slave node when a weight of the first Master node is less than the weight of the second Master node.

Based on the foregoing technical solutions, in the embodiments of the present disclosure, in addition to a Master node and a Slave node, a distributed cluster further includes a reference node and a secondary node of the Master node. The secondary node determines, according to a heartbeat message sent by the reference node, that the Master node is disconnected from the reference node, and detects that a heartbeat message sent by the Master node to the secondary node is also interrupted, to determine that the Master node is also disconnected from the secondary node to effectively determine that the Master node that is disconnected from both the secondary node and the reference node is faulty. In the embodiments of the present disclosure, the secondary node can rapidly and effectively determine, according to the heartbeat message that is sent by the reference node and that is used to indicate that the reference node is disconnected from the Master node and a detection result detected by the secondary node that a heartbeat message sent by the Master node is interrupted, that the Master node is faulty, which can effectively shorten a failure detection time of the Master node as compared with the other approaches.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

To help understand solutions for processing a failure in at least one distributed cluster provided in the embodiments of the present disclosure, the following concept is first described.

Heartbeat Message

The heartbeat message is a message sent by a sending source to a receiver. This type of message may enable the receiver to determine whether and when the sending source is faulty or is terminated. Generally, since the sending source is started, the sending source starts to send a heartbeat message until the sending source is disabled. During this period, the sending source uninterruptedly and periodically sends repeated heartbeat messages. When no heartbeat message is received by the receiver within a specific heartbeat message receiving period, the receiver may consider that the sending source is disabled, faulty, or currently unavailable.

A heartbeat message may be usually used for the purpose of HA or fault tolerance processing.

Figure 1:
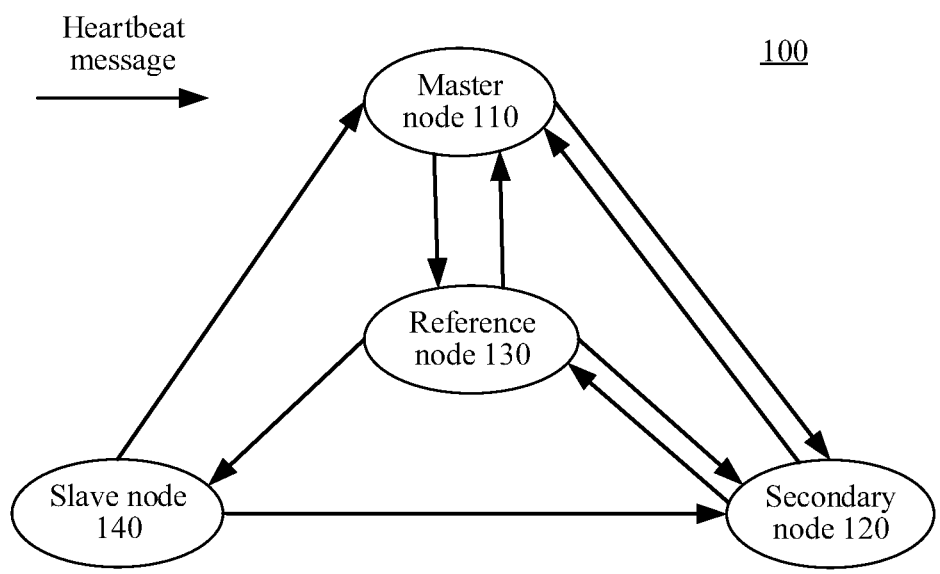
FIG. 1 shows a schematic diagram of a distributed cluster related to the embodiments of the present disclosure.

To help a person skilled in the art understand a method and a device for processing a failure in at least one distributed cluster, and a system that are provided in the embodiments of the present disclosure, the following first describes a distributed cluster related to the embodiments of the present disclosure with reference to FIG. 1.

As shown in FIG. 1, a distributed cluster 100 includes a Master node 110, a secondary node 120, a reference node 130, and a Slave node 140. The Master node 110, the secondary node 120, and the reference node 130 send a heartbeat message to each other. The reference node 130 further sends a heartbeat message to the Slave node 140. The Slave node 140 separately sends a heartbeat message to the Master node 110 and the secondary node 120.

As shown in FIG. 1, the Master node 110, the secondary node 120, and the reference node 130 send a heartbeat message to each other. Further, the Master node 110 separately sends a heartbeat message to the secondary node 120 and the reference node 130, the secondary node 120 separately sends a heartbeat message to the Master node 110 and the reference node 130, and the reference node 130 separately sends a heartbeat message to the Master node 110 and the secondary node 120. That is, the Master node 110, the secondary node 120, and the reference node 130 monitor each other to determine whether a node in the three nodes is faulty. It should be understood that, if a node is faulty, the node cannot send a heartbeat message to the other nodes, and cannot receive a heartbeat message sent by the other nodes.

As shown in FIG. 1, because the Slave node 140 separately sends a heartbeat message to the Master node 110 and the secondary node 120, both the Master node 110 and the secondary node 120 may monitor whether the Slave node 140 is faulty.

Because the reference node 130 sends a heartbeat message to the Slave node 140, the Slave node 140 may also monitor the reference node 130.

It should be understood that all nodes included in the distributed cluster 100 have a basic function of monitoring a failure of a local service computation object. The service computation object is, for example, a process or the like.

The Master node 110 is responsible for scheduling a service computation object (for example, a process), for example, providing arbitration for a service cluster at an application layer, which includes active/standby arbitration, cluster consistency coordinate control, and the like. The Master node 110 monitors all nodes in the distributed cluster 100.

The secondary node 120 is configured to serve as a secondary node of the Master node 110, that is, serve as a backup of the Master node 110. For example, when the Master node 110 is faulty, the secondary node 120 is rapidly upgraded to a master node to take over a service of the Master node 110. The secondary node 120 also monitors all the nodes in the distributed cluster 100.

The reference node 130 is configured to monitor, in real time, heartbeat messages sent by the Master node 110 and the secondary node 120, to find, in a timely manner, that the Master node 110 or the secondary node 120 is faulty. Further, for example, when it is detected that a heartbeat message sent by the Master node 110 to the reference node 130 is interrupted, the reference node 130 considers that the reference node 130 is disconnected from the Master node 110, and then sends, to the secondary node 120, a heartbeat message that carries indication information. The indication information is used to indicate that the reference node 130 is disconnected from the Master node 110 such that the secondary node 120 can effectively determine, according to the indication information, that the Master node 110 is faulty. For example, when the secondary node 120 also detects that a heartbeat message sent by the Master node 110 to the secondary node 120 is interrupted, the secondary node 120 may consider both a detection result of the secondary node 120 and the indication information in the heartbeat message sent by the reference node 130, to rapidly and accurately determine that the Master node 110 is faulty indeed.

Similarly, the reference node 130 may also assist the Master node 110 in rapidly and accurately determining that the secondary node 120 is faulty.

It should be understood that heartbeat messages sent by all nodes in a cluster may be sent based on a same heartbeat period. In other words, each node sends a heartbeat message according to a preset heartbeat period, and correspondingly, also receives a heartbeat message according to the preset heartbeat period. Therefore, for example, when no heartbeat message sent by the Master node 110 is received by the reference node 130 within a heartbeat period, the reference node 130 may consider that the heartbeat message of the Master node 110 is interrupted, and further consider that the reference node 130 is disconnected from the Master node 110.

It should be understood that the reference node 130 may also determine, according to a preset detection period, whether a heartbeat message of the Master node 110 is interrupted. The preset detection period may be, for example, set to three times or another integer multiple of a heartbeat period.

In conclusion, the reference node 130 serves as a reference party of the Master node 110 and the secondary node 120, and is configured to assist the Master node 110 and the secondary node 120 in rapidly and effectively detecting whether a node in the Master node 110 and the secondary node 120 is faulty, which can effectively enhance failure detection accuracy of the Master node 110.

The Slave node 140 is all other nodes in the cluster 100 except the Master node 110, the secondary node 120, and the reference node 130. The Slave node 140 is configured to be responsible for collecting status information of a local service computation object (for example, a process), report the status information to the Master node 110, and execute an instruction delivered by the Master node 110.

Optionally, the distributed cluster 100 related to the embodiments of the present disclosure includes one Master node 110 and one secondary node 120, and may include multiple reference nodes 130 and multiple Slave nodes 140.

Further, when the distributed cluster 100 is a virtual machine cluster, all nodes in the cluster 100 are virtual machines. For another example, when the distributed cluster 100 is a physical host cluster, all nodes in the cluster 100 are physical hosts. In addition, the foregoing nodes may also be logical sites or the like.

Figure 2:
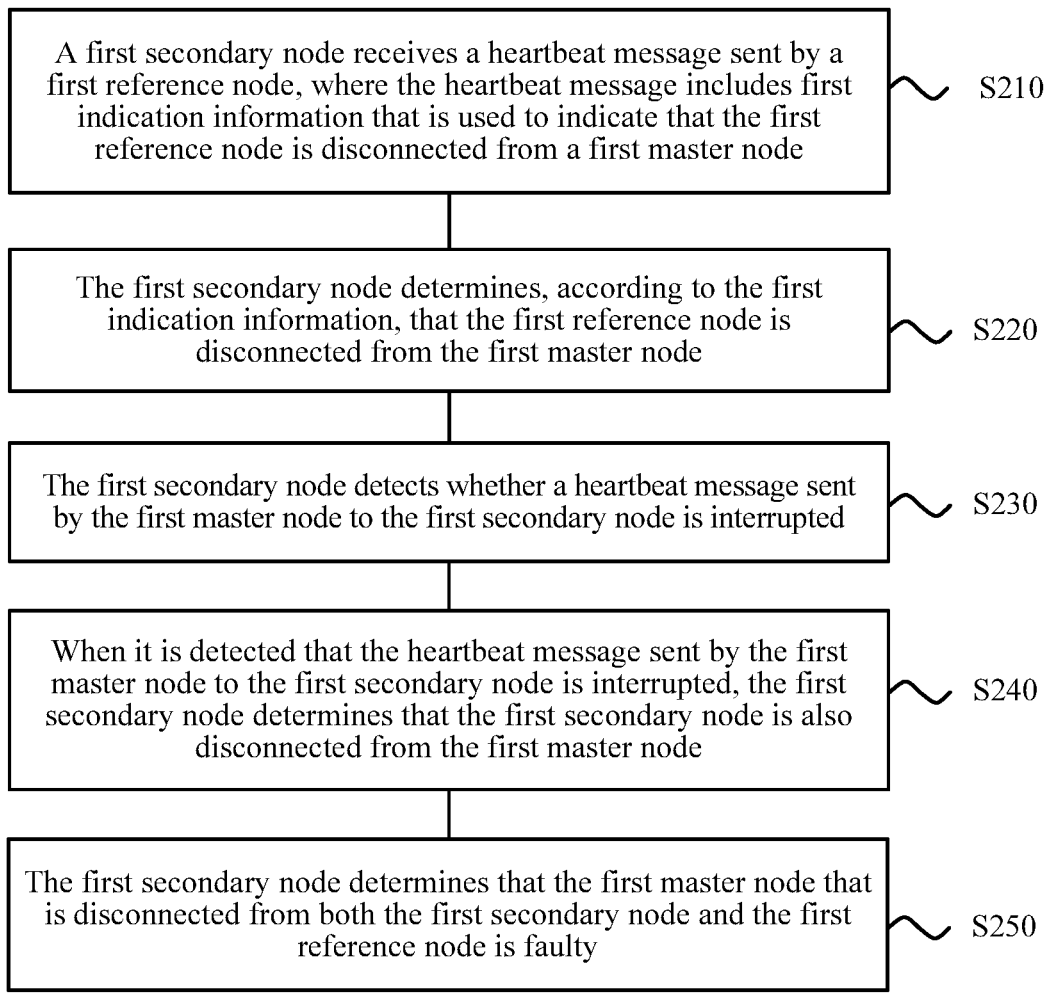
FIG. 2 shows a schematic flowchart of a method for processing a failure in at least one distributed cluster according to an embodiment of the present disclosure.

FIG. 2 shows a method 200 for processing a failure in at least one distributed cluster according to an embodiment of the present disclosure. The at least one distributed cluster includes a first distributed cluster. The first distributed cluster includes a first Master node and a first Slave node. The first distributed cluster further includes a first reference node and a first secondary node that serves as a backup of the first Master node. The method 200 includes the following steps.

Step S210: The first secondary node receives a heartbeat message sent by the first reference node, where the heartbeat message includes first indication information that is used to indicate that the first reference node is disconnected from the first Master node.

Step S220: The first secondary node determines, according to the first indication information, that the first reference node is disconnected from the first Master node.

Step S230: The first secondary node detects whether a heartbeat message sent by the first Master node to the first secondary node is interrupted.

Step S240: When it is detected that the heartbeat message sent by the first Master node to the first secondary node is interrupted, the first secondary node determines that the first secondary node is also disconnected from the first Master node.

Step S250: The first secondary node determines that the first Master node that is disconnected from both the first secondary node and the first reference node is faulty.

In this embodiment of the present disclosure, in addition to a Master node and a Slave node, a distributed cluster further includes a reference node and a secondary node of the Master node. The secondary node determines, according to a heartbeat message sent by the reference node, that the Master node is disconnected from the reference node, and detects that a heartbeat message sent by the Master node to the secondary node is also interrupted, to determine that the Master node is also disconnected from the secondary node in order to effectively determine that the Master node that is disconnected from both the secondary node and the reference node is faulty.

Therefore, according to the method for processing a failure in at least one distributed cluster that is provided in this embodiment of the present disclosure, the secondary node can rapidly and effectively determine, according to the heartbeat message that is sent by the reference node and that is used to indicate that the reference node is disconnected from the Master node and a detection result detected by the secondary node that a heartbeat message sent by the Master node is interrupted, that the Master node is faulty, which can effectively shorten a failure detection time of the Master node as compared with the other approaches.

Optionally, the first distributed cluster related to the method 200 for processing a failure in at least one distributed cluster that is provided in this embodiment of the present disclosure may be the distributed cluster 100 shown in FIG. 1. The first Master node, the first secondary node, the first reference node, and the first Slave node in this embodiment of the present disclosure are respectively corresponding to the Master node 110, the secondary node 120, the reference node 130, and the Slave node 140 in the distributed cluster 100 shown in FIG. 1.

In this embodiment of the present disclosure, heartbeat messages sent by all nodes may be sent based on a same heartbeat period. In other words, each node sends a heartbeat message according to a preset heartbeat period, and correspondingly, also receives a heartbeat message according to the preset heartbeat period. The heartbeat period may be preset in a system.

In this embodiment of the present disclosure, optionally, when no heartbeat message of the first Master node is received within a preset detection period, the first reference node determines that the first reference node is disconnected from the first Master node, and then sends, to the first secondary node in a next heartbeat period, the heartbeat message that includes the first indication information that is used to indicate that the first reference node is disconnected from the first Master node. The preset detection period may be equal to N times the heartbeat period. N may be 1 or an integer greater than 1. Further, for example, N is 4 to 7.

It should be further understood that node attributes of all nodes in a distributed cluster (that is, role information of the nodes, for example, a Master node, a Slave node, a reference node, and a secondary node) are well known. For example, each Slave node knows which node is a Master node, which node is a secondary node, and which node is a reference node in the distributed cluster.

Optionally, in this embodiment of the present disclosure, a heartbeat message sent by each node includes node attribute information (that is, a message type) that is of a receive-end node of the heartbeat message and that is recorded by a transmit-end node of the heartbeat message.

For example, in the distributed cluster 100 shown in FIG. 1, a node attribute that is of a receive end of a heartbeat message and that is included in the heartbeat message sent by the Master node 110 to the secondary node 120 is a secondary node. For another example, a heartbeat message sent by the Master node 110 to the reference node 130 includes node attribute information that is used to indicate a reference node.

Optionally, in this embodiment of the present disclosure, that the first secondary node detects whether a heartbeat message sent by the first Master node to the first secondary node is interrupted in step S230 includes the following.

The first secondary node detects whether a heartbeat message sent by the first Master node is received between a first moment and a second moment, where the first moment is a moment at which the first secondary node receives the heartbeat message that is sent by the first reference node and that includes the first indication information, the second moment is earlier than the first moment, and a time interval between the first moment and the second moment is N times a heartbeat period of sending a heartbeat message by the first Master node to the first secondary node, where N is a positive integer.

Further, for example, the first secondary node receives, at a first moment t1, the heartbeat message that is sent by the first reference node and that includes the first indication information, and the first secondary node detects, between the first moment t1 and a second moment t2 before the first moment t1, whether the heartbeat message sent by the first Master node is received.

The time interval between the first moment and the second moment may be an integer multiple of the heartbeat period of sending a heartbeat message by the first Master node to the first secondary node, for example, once, four times, or seven times.

It should be understood that, in step S230, the first secondary node may further use another feasible solution to detect whether the first secondary node is disconnected from the first Master node. For example, before receiving the heartbeat message that is of the first reference node and that includes the first indication information, the first secondary node may further independently determine whether the first secondary node is disconnected from the first Master node. This embodiment of the present disclosure sets no limitation thereto.

Therefore, according to the method for processing a failure in at least one distributed cluster that is provided in this embodiment of the present disclosure, a secondary node determines, according to a heartbeat message that includes first indication information and that is sent by a reference node and a detection result of the secondary node, that a Master node is disconnected from both the secondary node and the reference node in order to determine that the Master node is faulty. In this way, whether a Master node in a distributed cluster is faulty can be efficiently and accurately determined. In comparison with the other approaches, a failure detection time can be effectively shortened, and failure detection accuracy can also be improved.

Figure 3:
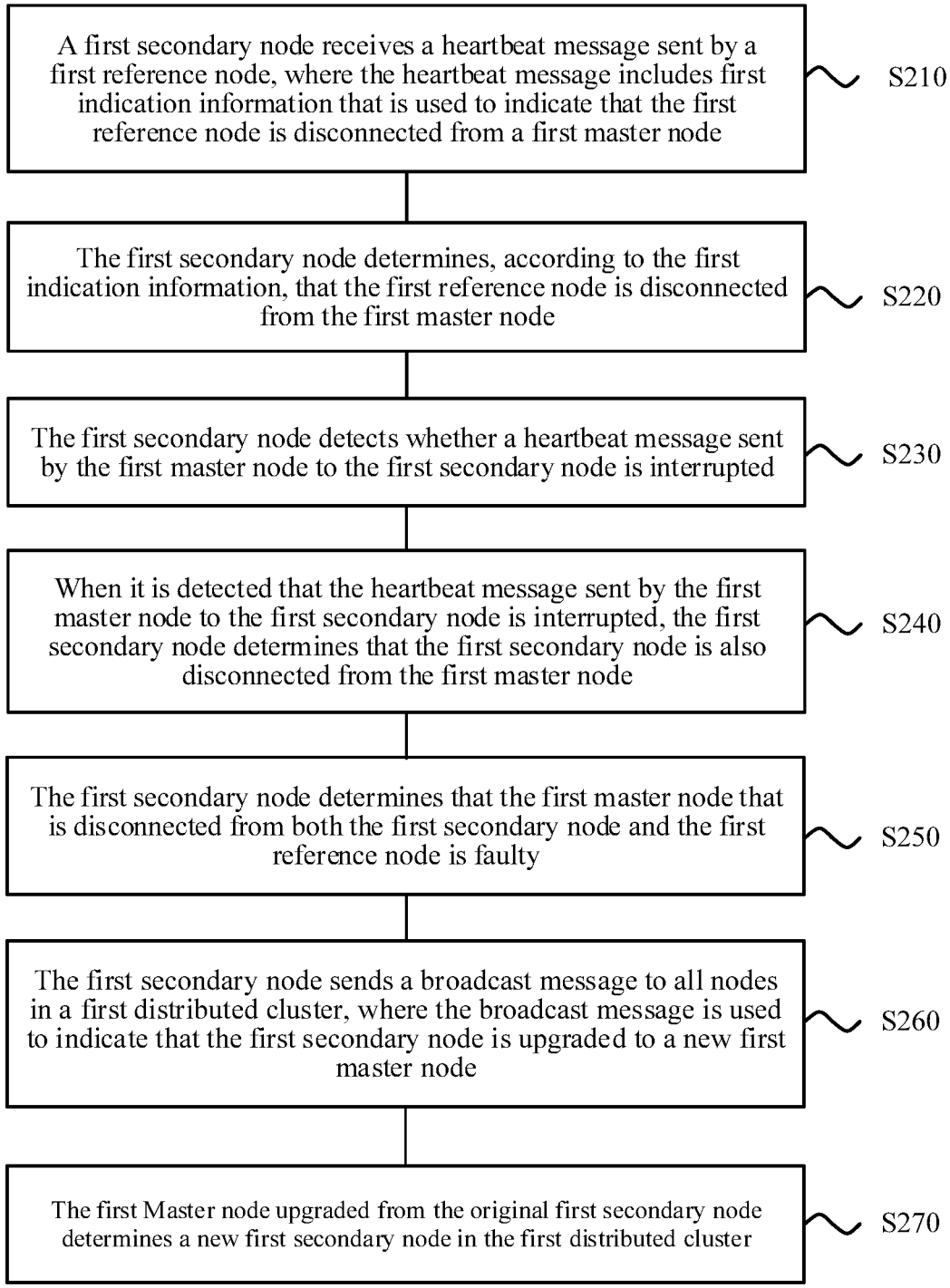
FIG. 3 shows another schematic flowchart of a method for processing a failure in at least one distributed cluster according to an embodiment of the present disclosure.

Optionally, as shown in FIG. 3, in this embodiment of the present disclosure, when the first Master node is faulty, the method 200 further includes the following step.

Step S260: The first secondary node sends a broadcast message to all nodes in the first distributed cluster, where the broadcast message is used to indicate that the first secondary node is upgraded to a new first Master node.

Further, the first secondary node is upgraded to a new first Master node in the first distributed cluster, that is, takes over a related service of the original first Master node (that is, the faulty first Master node).

Optionally, in this embodiment of the present disclosure, the method 200 further includes the following step.

Step S270: The first Master node upgraded from the original first secondary node determines a new first secondary node in the first distributed cluster.

Further, for example, the first Master node upgraded from the original first secondary node selects the new first secondary node from the first Slave node in the first distributed cluster. The new first secondary node and the original first secondary node have a same function, that is, are configured to monitor the first Master node and the first reference node in the first distributed cluster, and take over a service of the first Master node when the first Master node is faulty.

Therefore, in this embodiment of the present disclosure, after it is determined that a Master node is faulty, a secondary node is rapidly upgraded to a new Master node, which skips a phase in which a new Master node is temporarily elected in the other approaches. Therefore, a time for electing a new Master node is saved, and a failure in a cluster can be rapidly and conveniently recovered, which contributes to service continuity.

It should be understood that, in this embodiment of the present disclosure, after the first secondary node receives the heartbeat message that is sent by the first reference node and that includes the first indication information that is used to indicate that the first reference node is disconnected from the first Master node, if the first secondary node detects that the first secondary node is not disconnected from the first Master node, the foregoing actions in steps S250, S260, and S270 are omitted.

Optionally, in this embodiment of the present disclosure, there may be multiple first reference nodes.

Further, as shown in FIG. 1, for example, the distributed cluster 100 includes three reference nodes 131, 132, and 133, and a monitor cycle is formed by three nodes each of the reference nodes, the Master node 110, and the secondary node 120. That is, in the monitor cycle, the three nodes send a heartbeat message to each other, and monitor each other using the method described in the method 200 to determine whether a node in the three nodes is faulty.

Optionally, in this embodiment of the present disclosure, the secondary node 120 separately receives heartbeat messages A, B, and C sent by the reference nodes 131, 132, and 133. The heartbeat message A includes indication information that is used to indicate that the reference node 131 is disconnected from the Master node 110, the heartbeat message B includes indication information that is used to indicate that the reference node 132 is disconnected from the Master node 110, and the heartbeat message C includes indication information that is used to indicate that the reference node 133 is disconnected from the Master node 110. The secondary node 120 detects that the secondary node 120 is also disconnected from the Master node 110. The secondary node 120 deduces, according to the indication information in the heartbeat messages A, B, and C and detection information of the secondary node 120, that the Master node 110 is disconnected from the reference nodes 131, 132, and 133 and the secondary node 120, and therefore may accurately determine that the Master node 110 is faulty.

Therefore, in this embodiment of the present disclosure, the distributed cluster 100 includes multiple reference nodes 131, 132, and 133 and may provide a relatively large amount of reference information for the secondary node 120, which helps the secondary node 120 rapidly and accurately determine whether the Master node 110 is faulty.

It should be further understood that, in the foregoing embodiment in which multiple reference nodes are included, the secondary node 120 may independently detect whether the secondary node 120 is disconnected from the Master node 110, or when receiving the heartbeat message A and/or the heartbeat message B and/or the heartbeat message C, may detect whether the secondary node 120 is disconnected from the Master node 110.

With reference to FIG. 1, in the distributed cluster 100, the Master node 110 may also monitor a failure condition of the Slave node 140 according to the method for jointly monitoring one party by two parties that is described in the method 200.

Figure 4:
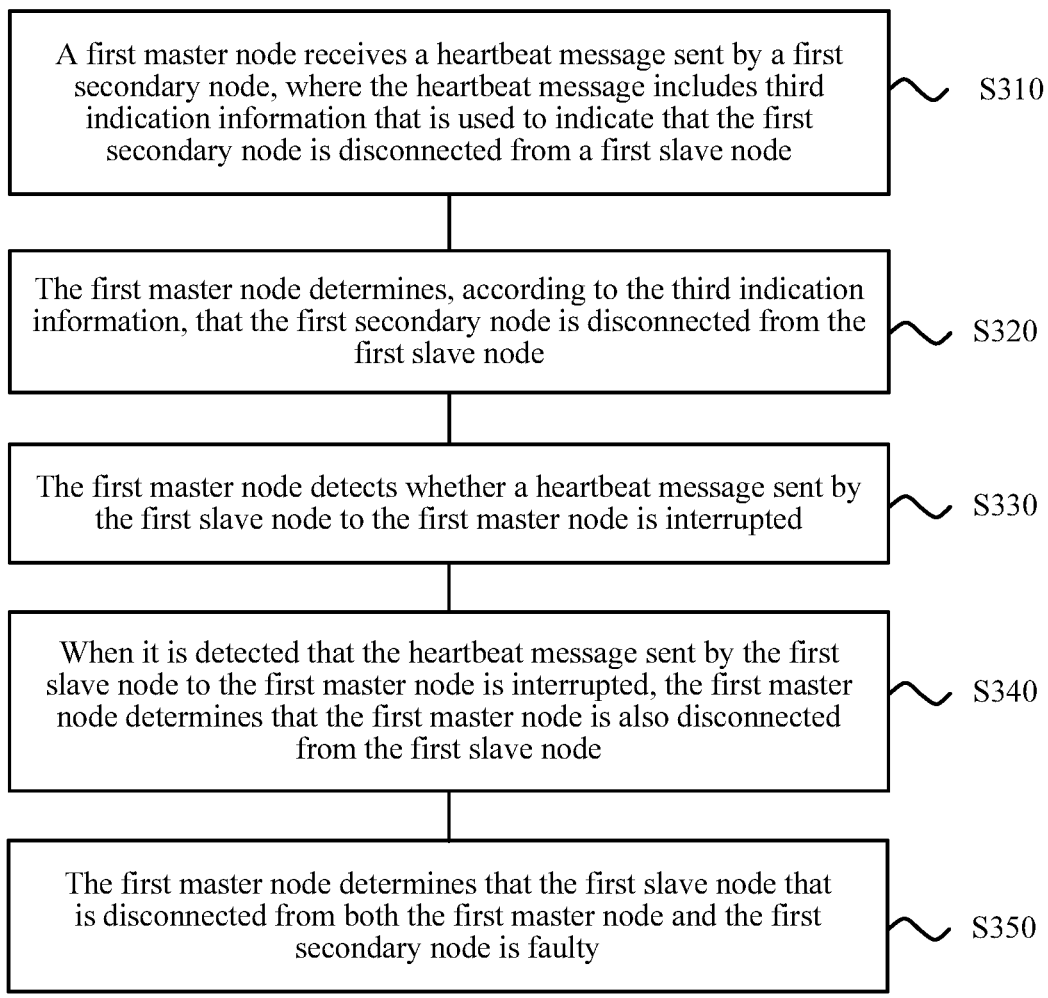
FIG. 4 shows still another schematic flowchart of a method for processing a failure in at least one distributed cluster according to an embodiment of the present disclosure.

FIG. 4 shows a schematic flowchart of a method 300 for processing a failure in at least one distributed cluster according to another embodiment of the present disclosure. The at least one distributed cluster includes a first distributed cluster. The first distributed cluster includes a first Master node and a first Slave node. The first distributed cluster further includes a first reference node and a first secondary node that serves as a backup of the first Master node. The method 300 includes the following steps.

Step S310: The first Master node receives a heartbeat message sent by the first secondary node, where the heartbeat message includes third indication information that is used to indicate that the first secondary node is disconnected from the first Slave node.

Step S320: The first Master node determines, according to the third indication information, that the first secondary node is disconnected from the first Slave node.

Step S330: The first Master node detects whether a heartbeat message sent by the first Slave node to the first Master node is interrupted.

Step S340: When it is detected that the heartbeat message sent by the first Slave node to the first Master node is interrupted, the first Master node determines that the first Master node is also disconnected from the first Slave node.

Step S350: The first Master node determines that the first Slave node that is disconnected from both the first Master node and the first secondary node is faulty.

In this embodiment of the present disclosure, in addition to a Master node and a Slave node, a distributed cluster further includes a reference node and a secondary node of the Master node. The Master node determines, according to a heartbeat message sent by the secondary node, that the secondary node is disconnected from the Slave node, and detects that a heartbeat message sent by the Slave node to the Master node is also interrupted, to determine that the Slave node is also disconnected from the Master node in order to effectively determine that the Slave node that is disconnected from both the Master node and the secondary node is faulty.

Therefore, according to the method for processing a failure in at least one distributed cluster that is provided in this embodiment of the present disclosure, the Master node can rapidly and effectively determine, according to the heartbeat message that is sent by the secondary node and that is used to indicate that the secondary node is disconnected from the Slave node and a detection result detected by the Master node that a heartbeat message sent by the Slave node is interrupted, that the Slave node is faulty. In comparison with the other approaches, a failure detection time of the Slave node can be effectively shortened, and failure detection accuracy can also be improved.

The Master node does not need to send a heartbeat message to all Slave nodes in this embodiment of the present disclosure, which is different from the other approaches. The Master node needs only to detect the heartbeat message sent by the Salve node to monitor the Slave node, and can determine a faulty Slave node with reference to indication information that is in the heartbeat message sent by the secondary node and that is used to indicate that the secondary node is disconnected from the Salve node. In comparison with an existing solution, a quantity of heartbeat messages processed by the Master node may be halved, which effectively reduces load of the Master node.

In this embodiment of the present disclosure, optionally, when no heartbeat message of the first Slave node is received within a preset detection period, the first secondary node determines that the first secondary node is disconnected from the first Slave node, and then sends, to the first Master node in a next heartbeat period, the heartbeat message that includes the third indication information that is used to indicate that the first secondary node is disconnected from the first Slave node. The preset detection period may be equal to N times a heartbeat message sending period. N may be 1 or an integer greater than 1.

Optionally, in this embodiment of the present disclosure, the heartbeat message that is sent by the secondary node and that includes the third indication information further includes indication information that is used to indicate a node attribute of a receive end of the heartbeat message. The node attribute may also be referred to as role information (Message Type).

Optionally, in this embodiment of the present disclosure, that the first Master node detects whether a heartbeat message sent by the first Slave node to the first Master node is interrupted in step S330 includes the following.

The first Master node detects whether a heartbeat message sent by the first Slave node is received between a third moment and a fourth moment, where the third moment is a moment at which the first Master node receives the heartbeat message that is sent by the first secondary node and that includes the third indication information, the fourth moment is earlier than the third moment, and a time interval between the third moment and the fourth moment is N times a heartbeat period of sending a heartbeat message by the first Slave node to the first Master node, where N is a positive integer.

Further, for example, the first Master node receives, at a third moment t3, the heartbeat message that is sent by the first secondary node and that includes the third indication information, and the first Master node detects, between the third moment t3 and a fourth moment t4 before the third moment t3, whether a heartbeat message sent by the first Slave node is received.

The time interval between the third moment and the fourth moment may be an integer multiple of the heartbeat period of sending a heartbeat message by the first Slave node to the first Master node, for example, once, four times, or seven times.

It should be understood that, in step S330, the first Master node may further use another feasible solution to detect whether the first Master node is disconnected from the first Slave node. For example, before receiving the heartbeat message that is sent by the first secondary node and that includes the third indication information, the first Master node may further independently determine whether the first Master node is disconnected from the first Slave node. This embodiment of the present disclosure sets no limitation thereto.

Therefore, in this embodiment of the present disclosure, a Master node determines, according to a heartbeat message that includes third indication information and that is sent by a secondary node and information about detection performed on a Slave node by the Master node, that both the Master node and the secondary node are disconnected from the Salve node, and therefore can efficiently and accurately determine that the Slave node is faulty. In comparison with an existing cluster failure processing solution, a failure detection time is effectively shortened, and power consumption of the Master node in a failure detection process can also be reduced.

An existing distributed cluster includes nodes in two roles, that is, a Master node and a Slave node. The two nodes send a heartbeat message to each other to monitor whether a node in the two nodes is faulty. Because of singleness of monitoring information, generally, heartbeat message detection needs to be performed for multiple times. For example, only when no heartbeat message sent by the Master node is received in multiple preset detection periods (an integer multiple of a heartbeat period), the Slave node may consider that the Master node is faulty, which results in a relatively long failure detection time.

The distributed cluster provided in this embodiment of the present disclosure includes nodes in four roles, for example, as shown in FIG. 1, a Master node, a Slave node, a reference node, and a secondary node. The Master node, the secondary node, and the reference node send a heartbeat message to each other, and can monitor each other. The Slave node sends a heartbeat message to the Master node and the secondary node, that is, the Master node and the secondary node can jointly monitor the Slave node. The reference node further sends a heartbeat message to the Slave node such that the Slave node perceives a cluster in which the Slave node is located. For example, the Master node can rapidly and accurately determine, by referring to the heartbeat message sent by the secondary node and information about monitoring performed on the Salve node by the Master node, whether the Slave node is faulty. In this embodiment of the present disclosure, if the Master node finds that the secondary node or the reference node or both are faulty, the Master node may determine a new secondary node and/or reference node in the Slave node. If the secondary node finds that the Master node is faulty, the secondary node is rapidly upgraded to a new Master node. That is, in this embodiment of the present disclosure, the nodes in four roles in the cluster maintain integrity and validity of the cluster in real time.

In addition, in this embodiment of the present disclosure, the Master node receives only the heartbeat message of the Slave node but does not send a heartbeat message to each Slave node, and may effectively monitor a failure condition of the Slave node according to the heartbeat message sent by the secondary node and a detection result of the Master node. In comparison with the other approaches, on the one hand, failure detection efficiency can be improved, and on the other hand, load of the Master node is effectively reduced.

Optionally, in this embodiment of the present disclosure, the method 300 further includes the following steps (not shown).

Step S360: The first Master node detects, within a preset detection period, whether a heartbeat message sent by the first secondary node and a heartbeat message sent by the first reference node are received, where the preset detection period is M times the heartbeat period of sending a heartbeat message, and M is a positive integer.

Step S370: When neither a heartbeat message sent by the first secondary node nor a heartbeat message sent by the first reference node is received within the preset detection period, the first Master node determines that both the first secondary node and the first reference node are faulty.

Further, the preset detection period may be a time period that is preset in a system and that is used for determining a failure, for example, may be directly equal to a heartbeat period, or may be four times or seven times a heartbeat period.

Optionally, in this embodiment of the present disclosure, the method 300 further includes the following step (not shown).

Step S380: When both the first secondary node and the first reference node are faulty, the first Master node determines a new first secondary node and a new first reference node in the first distributed cluster.

Further, for example, the new secondary node and the new reference node are randomly specified, using a distributed election algorithm, in a node set that meets a specific principle (for example, a normal heartbeat).

In this embodiment of the present disclosure, the Master node comprehensively determines a failure condition of the Slave node using multipath detection results, which can shorten a failure detection time on the one hand, and can improve failure detection reliability on the other hand.

A typical cluster failure scenario is that a network cluster is split into multiple sub-clusters because a switching node or a routing node is faulty. In the cluster including four roles that is related to this embodiment of the present disclosure, the foregoing cluster splitting problem can be effectively avoided or resolved.

Optionally, in this embodiment of the present disclosure, the at least one distributed cluster further includes a second distributed cluster, and the second distributed cluster includes a second Master node, a second Slave node, a second reference node, and a second secondary node that serves as a backup of the second Master node. The method 300 further includes the following steps (not shown).

Step S3010: The first Master node receives a heartbeat message sent by the second reference node, where the heartbeat message includes fourth indication information that is used to indicate that a node attribute of a receive end of the heartbeat message is a Slave node, the second reference node is configured to separately send the heartbeat message that includes the fourth indication information to the second Slave node and all nodes in the first distributed cluster, and the second distributed cluster and the first distributed cluster have a same cluster identifier.

Further, the first distributed cluster and the second distributed cluster have the same cluster identifier. Therefore, the second reference node in the second distributed cluster can perceive a node in the first distributed cluster, and considers all the nodes in the first distributed cluster as Slave nodes. Therefore, the second reference node separately sends, to the second Salve node in the second distributed cluster and all the nodes in the first distributed cluster, the heartbeat message that includes the indication information that is used to indicate that the node attribute of the receive end is the Salve node.

Step S3020: The first Master node determines, according to the fourth indication information, that the node attribute that is of the receive end of the heartbeat message and that is indicated in the heartbeat message sent by the second reference node does not match a node attribute of the first Master node, and determines that the second distributed cluster in which the second reference node is located and the first distributed cluster in which the first Master node is located are two sub-clusters formed after one network distributed cluster is split.

Step S3030: The first Master node negotiates with the second Master node in the second distributed cluster to integrate the first distributed cluster and the second distributed cluster.

Optionally, in this embodiment of the present disclosure, that the first Master node negotiates with the second Master node in the second distributed cluster in step S3030 includes the following.

Step S3031: The first Master node sends, to all nodes in the first distributed cluster and the second distributed cluster, a broadcast message that is used to indicate that the node attribute of the first Master node is a Master node.

Step S3032: The first Master node receives a negotiation message sent by the second Master node, where the negotiation message includes information that is used to indicate a weight of the second Master node, and the negotiation message is sent by the second Master node to the first Master node when it is detected that the node attribute indicated in the broadcast message is the same as a node attribute of the second Master node.

Step S3033: When a weight of the first Master node is greater than or equal to the weight of the second Master node, the first Master node sends, to the second Master node, a negotiation response message that is used to instruct to downgrade the second Master node to a Slave node.

Step S3034: When a weight of the first Master node is less than the weight of the second Master node, the first Master node sends, to all the nodes in the first distributed cluster and the second distributed cluster, a broadcast message that is used to indicate that the first Master node is downgraded to a Slave node.

Figure 5A:
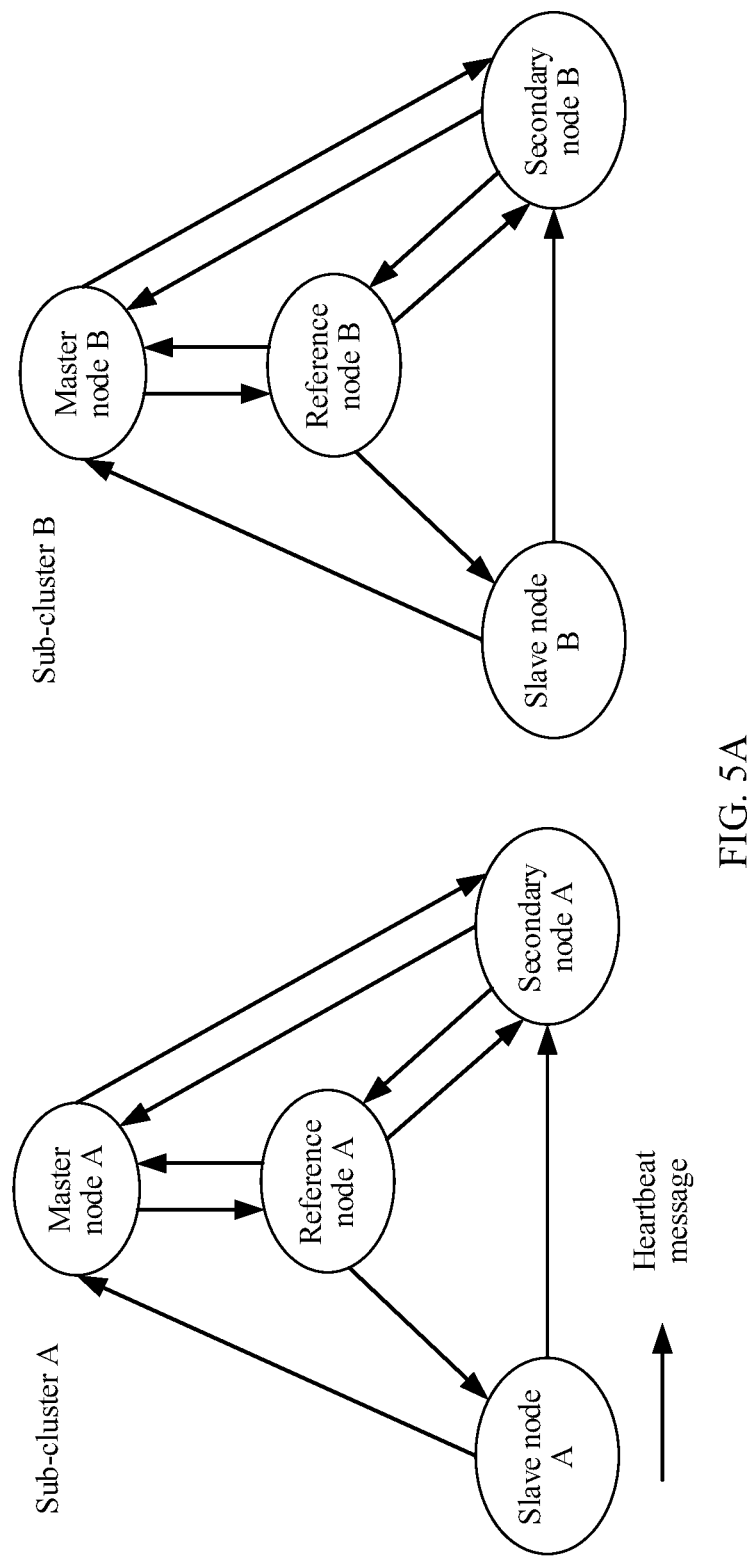
FIG. 5A, FIG. 5B, FIG. 5C, and FIG. 5D show schematic diagrams of a method for processing a failure in at least one distributed cluster according to an embodiment of the present disclosure.

Further, as shown in FIG. 5A, one network cluster is split into two sub-clusters A and B. The sub-clusters A and B are obtained after the network cluster is split. Therefore, the sub-clusters A and B have a same cluster identifier. It is denoted that the sub-cluster A includes a Master node A, a secondary node A, a reference node A, and a Slave node A, and that the sub-cluster B includes a Master node B, a secondary node B, a reference node B, and a Slave node B. Each node in the sub-cluster A and the sub-cluster B has a feature of a corresponding node in the distributed cluster 100 shown in FIG. 1.

From the perspective of the reference node B in the sub-cluster B, the reference node B can receive heartbeat messages of the Master node B and the secondary node B. Therefore, from the perspective of the reference node B, other nodes except the Master node B and the secondary node B are all Slave nodes. That is, all nodes in the sub-cluster A are disconnected Slave nodes from the perspective of the reference node B.

Figure 5B:
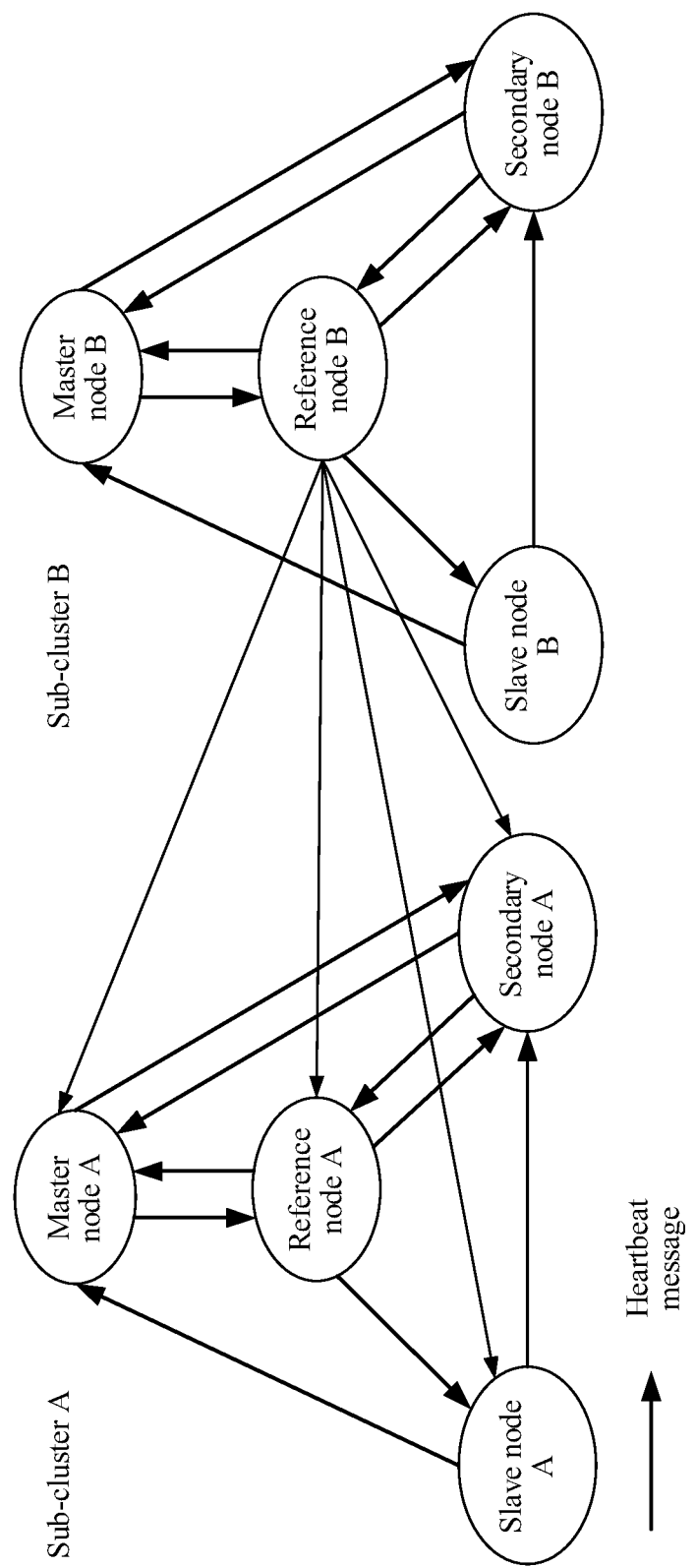

As shown in FIG. 5B, the reference node B in the sub-cluster B sends a heartbeat message (a node attribute of a receive end is Master) to the Master node B in the sub-cluster B, sends a heartbeat message (a node attribute of a receive end is standby) to the secondary node B in the sub-cluster B, and sends a heartbeat message (a node attribute of a receive end is Slave) to the Slave node B in the sub-cluster B. In addition, the reference node B in the sub-cluster B further sends a heartbeat message to all nodes in the sub-cluster A. A node attribute that is of a receive end and that is indicated in the heartbeat message is a Slave node.

All the nodes in the sub-cluster A receive the heartbeat message that is sent by the reference node B in the sub-cluster B and that includes indication information that is used to indicate that the node attribute of the receive end is a Slave node. After receiving the heartbeat message sent by the reference node B, the Master node A, the secondary node A, and the reference node A in the sub-cluster A may perceive that the node attribute carried in the heartbeat message does not match node attribute information of the Master node A, the secondary node A, and the reference node A.

Figure 5C:
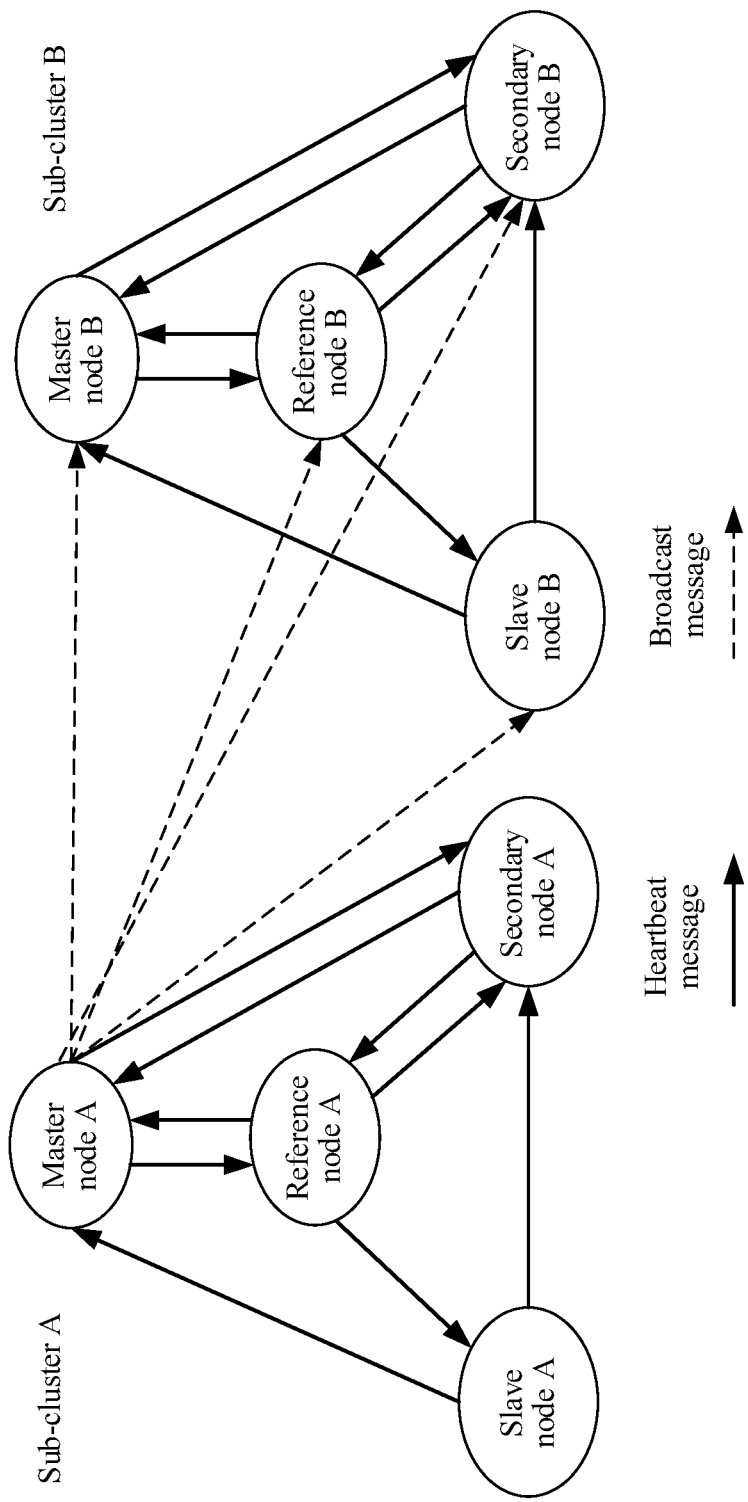

The Master node A in the sub-cluster A is used as an example. The Master node A in the sub-cluster A determines, according to the heartbeat message sent by the reference node B, that the node attribute carried in the heartbeat message does not match node attribute information of the Master node A. The Master node A in the sub-cluster A sends, to all nodes, a broadcast message that is used to indicate a node attribute of the Master node A, as shown in FIG. 5C.

After receiving the broadcast message sent by the Master node A, the Master node B in the sub-cluster B detects a role conflict, and sends a negotiation message to the Master node A in the sub-cluster A. The negotiation message carries weight information of the Master node B.

After receiving the negotiation message sent by the Master node B, the Master node A compares a weight of the Master node A with that of the Master node B. If it is determined that the weight of the Master node A is higher than the weight of the Master node B, the Master node A sends, to the Master node B, a negotiation response message that is used to instruct to downgrade the Master node B to a Slave node. If it is determined that the weight of the Master node B is higher than the weight of the Master node A, the Master node A is actively downgraded to a Slave node.

Further, a weight of a node is, for example, life duration of the node, freshness of local caches of the node (generally represented by a version number), a scope of a managed cluster, or the like.

Figure 5D:
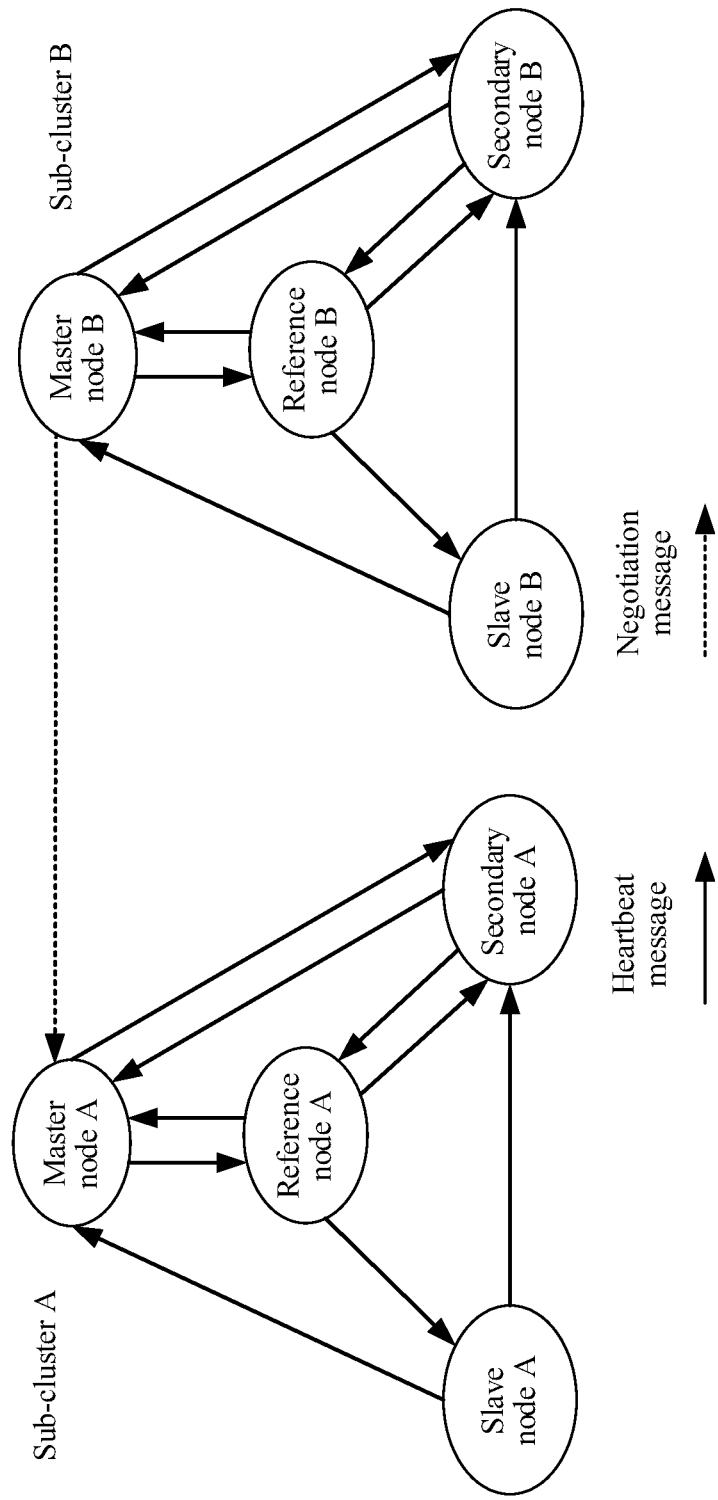

It should be understood that FIG. 5C shows only a schematic diagram in which the Master node A is used as an example. Actually, after receiving the heartbeat message that is sent by the reference node B and that is used to indicate that the node attribute of the receive end is a Slave node, the secondary node A and the reference node A in the sub-cluster A may also determine that the node attribute carried in the heartbeat message does not match node attribute information of the secondary node B and the reference node B, and send broadcast messages that include node attributes of the secondary node B and the reference node B. The secondary node A may also negotiate with the secondary node B for a final secondary node using a schematic diagram similar to FIG. 5C and FIG. 5D, and the reference node A may also negotiate with the reference node B for a final reference node according to a schematic diagram similar to FIG. 5C and FIG. 5D.

Optionally, in the method 200 provided in the embodiment shown in FIG. 2, the at least one distributed cluster further includes a second distributed cluster, the second distributed cluster includes a second Master node, a second Slave node, a second reference node, and a second secondary node that serves as a backup of the second Master node. The method 200 further includes the following steps (not shown).

Step S2010: The first secondary node receives a heartbeat message sent by the second reference node, where the heartbeat message includes second indication information that is used to indicate that a node attribute of a receive end of the heartbeat message is a Slave node, the second reference node is configured to separately send the heartbeat message that includes the second indication information to the second Slave node and all the nodes in the first distributed cluster, and the second distributed cluster and the first distributed cluster have a same cluster identifier.

Step S2020: The first secondary node determines, according to the second indication information, that the node attribute that is of the receive end of the heartbeat message and that is indicated in the heartbeat message sent by the second reference node does not match a node attribute of the first secondary node, and determines that the second distributed cluster in which the second reference node is located and the first distributed cluster in which the first secondary node is located are two sub-clusters formed after one network distributed cluster is split.

Step S2030: The first secondary node negotiates with the second secondary node in the second distributed cluster to integrate the first distributed cluster and the second distributed cluster.

Optionally, in this embodiment of the present disclosure, that the first secondary node negotiates with the second secondary node in the second distributed cluster in S2030 includes the following steps.

Step S2031: The first secondary node sends, to all nodes in the first distributed cluster and the second distributed cluster, a broadcast message that is used to indicate that the node attribute of the first secondary node is a secondary node.

Step S2032: The first secondary node receives a negotiation message sent by the second secondary node, where the negotiation message includes information that is used to indicate a weight of the second secondary node, and the negotiation message is sent by the second secondary node to the first secondary node when it is detected that the node attribute indicated in the broadcast message is the same as a node attribute of the second secondary node.

Step S2033: When a weight of the first secondary node is greater than or equal to the weight of the second secondary node, the first secondary node sends, to the second secondary node, a negotiation response message that is used to instruct to downgrade the second secondary node to a Slave node.

Step S2034: When a weight of the first secondary node is less than the weight of the second secondary node, the first secondary node sends, to all the nodes in the first distributed cluster and the second distributed cluster, a broadcast message that is used to indicate that the first secondary node is downgraded to a Slave node.

A specific procedure is consistent with that shown in FIGS. 5A-5D, and details are not described herein again.

It should be understood that the first distributed cluster in this embodiment of the present disclosure may be corresponding to the sub-cluster A shown in FIGS. 5A-5D, and the second distributed cluster corresponds to the sub-cluster B shown in FIGS. 5A-5D.

It should be further understood that FIG. 5A shows only that the reference node B in the sub-cluster B considers all the nodes in the sub-cluster A as Slave nodes, and sends, to all the nodes in the sub-cluster A, the heartbeat message that includes the indication information that indicates that the node attribute of the receive end is a Slave node. It should be further understood that, before the sub-cluster A and the sub-cluster B are integrated into one cluster, the reference node A in the sub-cluster A may also consider all the nodes in the sub-cluster B as Slave nodes, and also sends, to all the nodes in the sub-cluster B, the heartbeat message that includes the indication information that indicates that the node attribute of the receive end is a Slave node. The Master node B, the reference node B, and the secondary node B in the sub-cluster B may also perform actions shown in FIG. 5B, FIG. 5C, and FIG. 5D, until the sub-cluster A and the sub-cluster B are integrated into one cluster.

It should be further understood that the foregoing describes, with reference to FIGS. 5A-5D, only a recovery process of integrating two sub-clusters after one distributed cluster is split into the two sub-clusters. A cluster integration recovery solution provided in this embodiment of the present disclosure is also applicable to a scenario in which more than two split distributed sub-clusters are integrated into one distributed cluster. This embodiment of the present disclosure sets no limitation thereto.

In this embodiment of the present disclosure, a heartbeat message sent by each node carries node attribute information (role information) that is of a receive-end node of the heartbeat message and that is considered by a transmit-end node of the heartbeat message. In this way, the node receiving the heartbeat message can perceive cluster splitting, and then trigger a subsequent action to integrate split clusters.

In conclusion, according to the method for processing a failure in at least one distributed cluster that is provided in this embodiment of the present disclosure, a cluster failure detection time can be effectively shortened, failure detection accuracy can be effectively improved, and load on the Master node in processing a heartbeat message can also be reduced.

The foregoing describes, with reference to FIG. 1 to FIG. 3, a process in which a secondary node in a distributed cluster provided in the embodiments of the present disclosure determines that a Master node is faulty, and describes, with reference to FIG. 1 and FIG. 4, a process in which a Master node in a distributed cluster provided in the embodiments of the present disclosure determines that a Slave node is faulty. The following describes, from the perspective of a reference node, a method for processing a failure in a distributed cluster that is provided in an embodiment of the present disclosure.

Figure 6:
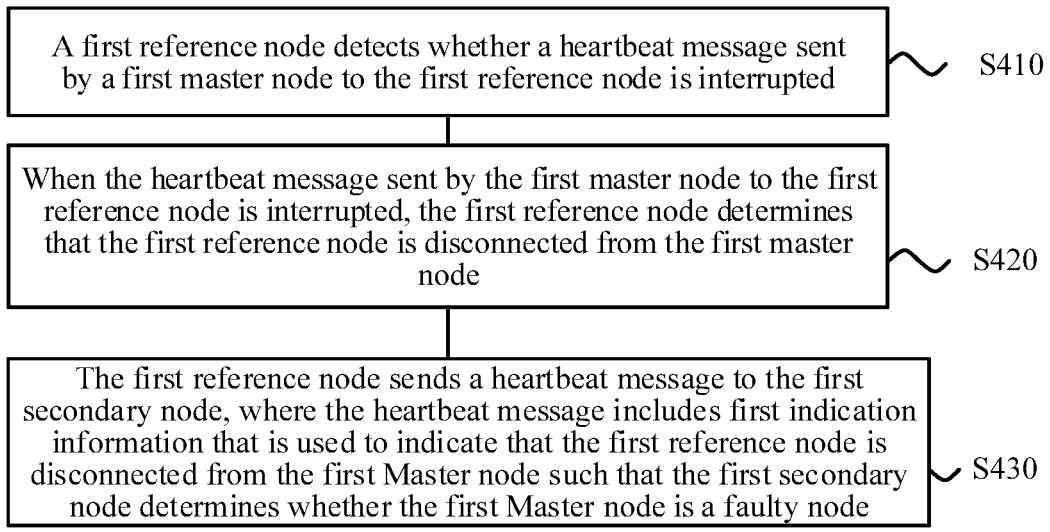
FIG. 6 shows yet another schematic flowchart of a method for processing a failure in at least one distributed cluster according to an embodiment of the present disclosure.

FIG. 6 shows a method 400 for processing a failure in at least one distributed cluster according to another embodiment of the present disclosure. The at least one distributed cluster includes a first distributed cluster. The first distributed cluster includes a first Master node and a first Slave node. The first distributed cluster further includes a first reference node and a first secondary node that serves as a backup of the first Master node. The method 400 includes the following steps.

Step S410: The first reference node detects whether a heartbeat message sent by the first Master node to the first reference node is interrupted.

Step S420: When the heartbeat message sent by the first Master node to the first reference node is interrupted, the first reference node determines that the first reference node is disconnected from the first Master node.

Step S430: The first reference node sends a heartbeat message to the first secondary node, where the heartbeat message includes first indication information that is used to indicate that the first reference node is disconnected from the first Master node such that the first secondary node determines whether the first Master node is a faulty node.

In this embodiment of the present disclosure, when a reference node determines that the reference node is disconnected from a Master node, the reference node sends, to a secondary node, a heartbeat message that includes indication information that is used to indicate the condition such that the secondary node further determines, by referring to the indication information, whether the Master node is faulty. This helps the secondary node to comprehensively determine a failure condition in a distributed cluster according to multipath detection information, which can effectively improve failure detection efficiency and accuracy.

Optionally, in this embodiment of the present disclosure, that the first reference node detects whether a heartbeat message sent by the first Master node to the first reference node is interrupted in step S410 includes the following.

The first reference node detects, within a preset detection period, whether the heartbeat message sent by the first Master node is received.

Further, the preset detection period may be N times a heartbeat period of sending a heartbeat message by the first Master node to the first reference node, where N is a positive integer.

Optionally, in this embodiment of the present disclosure, the at least one distributed cluster further includes a second distributed cluster. The second distributed cluster includes a second Master node, a second Slave node, a second reference node, and a second secondary node that serves as a backup of the second Master node. The second distributed cluster and the first distributed cluster are two sub-clusters formed after one network cluster is split. The method 400 further includes separately sending, by the first reference node, a heartbeat message to the first Slave node in the first distributed cluster and all nodes in the second distributed cluster, where the heartbeat message includes indication information that is used to indicate that a node attribute of a receive end of the heartbeat message is a Slave node such that the second Master node, the second secondary node, and the second reference node in the second distributed cluster can perceive the first distributed cluster using the indication information.

Further, as shown in FIG. 5B, the reference node B in the sub-cluster B sends, to the Slave node B and all nodes in the sub-cluster A, a heartbeat message that includes indication information that is used to indicate that a receive end is a Slave node.

It should be understood that the first reference node in this embodiment of the present disclosure may be corresponding to the second reference node related to the method 200 and the method 300, and may be corresponding to the reference node B shown in FIG. 5B.

In this embodiment of the present disclosure, a heartbeat message sent by a reference node carries indication information that is used to indicate a node attribute of a receive end of the heartbeat message. In this way, a receive-end node of the heartbeat message can perceive cluster splitting, and then trigger a subsequent action to integrate split clusters.

In conclusion, in the method for processing a failure in at least one distributed cluster that is provided in this embodiment of the present disclosure, in addition to a Master node and a Slave node, the first distributed cluster further includes a reference node and a secondary node of the Master node. The secondary node determines, according to a heartbeat message sent by the reference node, that the Master node is disconnected from the reference node, and detects that a heartbeat message sent by the Master node to the secondary node is also interrupted, to determine that the Master node is also disconnected from the secondary node in order to effectively determine that the Master node that is disconnected from both the secondary node and the reference node is faulty. The Master node determines, according to a heartbeat message sent by the secondary node, that the secondary node is disconnected from the Slave node, and detects that a heartbeat message sent by the Slave node to the Master node is also interrupted to determine that the Slave node is also disconnected from the Master node in order to effectively determine that the Slave node that is disconnected from both the Master node and the secondary node is faulty. That is, the distributed cluster provided in this embodiment of the present disclosure includes a Master node, a Slave node, a secondary node, and a reference node, and may comprehensively determine, according to detection results of nodes in two parties, whether a third-party node is faulty such that a failure can be efficiently and accurately detected. In comparison with the other approaches, a failure detection time can be effectively shortened, and load on the Master node in processing a heartbeat message can also be reduced.

Figure 7:
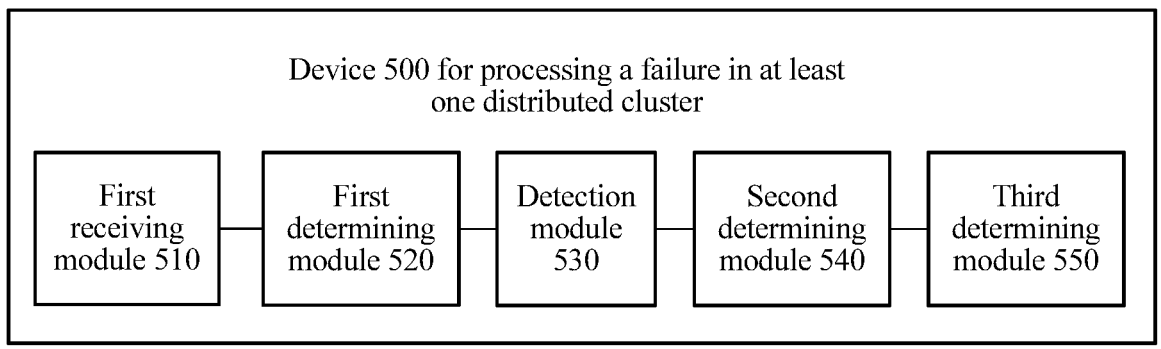
FIG. 7 shows a schematic block diagram of a device for processing a failure in at least one distributed cluster according to an embodiment of the present disclosure.
Figure 8:
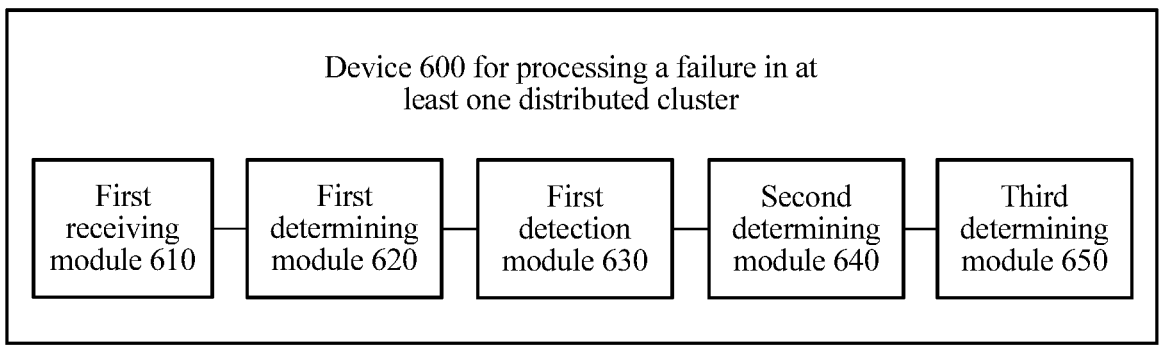
FIG. 8 shows another schematic block diagram of a device for processing a failure in at least one distributed cluster according to an embodiment of the present disclosure.

With reference to FIG. 1 to FIG. 6, the foregoing describes a method for processing a failure in at least one distributed cluster that is provided in the embodiments of the present disclosure. With reference to FIG. 7 and FIG. 8, the following describes a device for processing a failure in at least one distributed cluster that is provided in the embodiments of the present disclosure.

FIG. 7 shows a schematic block diagram of a device 500 for processing a failure in at least one distributed cluster according to an embodiment of the present disclosure. The at least one distributed cluster includes a first distributed cluster. The first distributed cluster includes a first Master node and a first Slave node. The first distributed cluster further includes a first reference node and a first secondary node that serves as a backup of the first Master node. The device 500 is the first secondary node. The device 500 includes a first receiving module 510 configured to receive a heartbeat message that is sent by the first reference node and that includes a first indication information, a first determining module 520 configured to determine, according to the first indication information received by the first receiving module 510, that the first reference node is disconnected from the first Master node, a detection module 530 configured to detect whether a heartbeat message sent by the first Master node to the device 500 is interrupted, a second determining module 540 configured to determine that the device 500 is also disconnected from the first Master node when the detection module 530 detects that the heartbeat message sent by the first Master node to the device 500 is interrupted, and a third determining module 550 configured to determine, according to results of the determining by the first determining module 520 and the second determining module 540, that the first Master node is faulty.

In the first distributed cluster, the first reference node is configured to send a heartbeat message to the first secondary node when it is detected that the heartbeat message sent by the first Master node to the first reference node is interrupted. The heartbeat message includes the first indication information that is used to indicate that the first reference node is disconnected from the first Master node.

In this embodiment of the present disclosure, in addition to a Master node and a Slave node, the first distributed cluster further includes a reference node and a secondary node of the Master node. The secondary node determines, according to a heartbeat message sent by the reference node, that the Master node is disconnected from the reference node, and detects that a heartbeat message sent by the Master node to the secondary node is also interrupted to determine that the Master node is also disconnected from the secondary node in order to effectively determine that the Master node that is disconnected from both the secondary node and the reference node is faulty.

Therefore, the device 500 provided in this embodiment of the present disclosure can rapidly and effectively determine, according to a heartbeat message that is sent by a reference node and that is used to indicate that the reference node is disconnected from a Master node and a detection result detected by the device that a heartbeat message sent by the Master node is interrupted, that the Master node is faulty, which can effectively shorten a failure detection time of the Master node as compared with the other approaches.

Optionally, the distributed cluster related to the device 500 for processing a failure in at least one distributed cluster that is provided in this embodiment of the present disclosure may be the distributed cluster 100 shown in FIG. 1.

Optionally, in this embodiment of the present disclosure, the device 500 further includes a sending module (not shown) configured to send a broadcast message to all nodes in the first distributed cluster when the third determining module 550 determines that the first Master node is faulty, where the broadcast message is used to indicate that the device 500 is upgraded to a new first Master node.

Optionally, in this embodiment of the present disclosure, the detection module 530 is further configured to detect whether a heartbeat message sent by the first Master node is received between a first moment and a second moment. The first moment is a moment at which the device 500 receives the heartbeat message that is sent by the first reference node and that includes the first indication information. The second moment is earlier than the first moment. A time interval between the first moment and the second moment is N times a heartbeat period of sending a heartbeat message by the first Master node to the device 500, where N is a positive integer.

Optionally, in this embodiment of the present disclosure, the at least one distributed cluster further includes a second distributed cluster. The second distributed cluster includes a second Master node, a second Slave node, a second reference node, and a second secondary node that serves as a backup of the second Master node. The device 500 further includes a second receiving module (not shown) configured to receive a heartbeat message sent by the second reference node, where the heartbeat message includes second indication information that is used to indicate that a node attribute of a receive end of the heartbeat message is a Slave node, the second reference node is configured to separately send the heartbeat message that includes the second indication information to the second Slave node and all the nodes in the first distributed cluster, and the second distributed cluster and the first distributed cluster have a same cluster identifier, a fourth determining module (not shown) configured to determine, according to the second indication information received by the second receiving module, that the node attribute that is of the receive end of the heartbeat message and that is indicated in the heartbeat message sent by the second reference node does not match a node attribute of the device 500, and determine that the second distributed cluster in which the second reference node is located and the first distributed cluster in which the device 500 is located are two sub-clusters formed after one network distributed cluster is split, and a negotiation module (not shown) configured to negotiate with the second secondary node in the second distributed cluster to integrate the first distributed cluster and the second distributed cluster.

Optionally, in this embodiment of the present disclosure, the negotiation module includes a first sending unit (not shown) configured to send, to all nodes in the first distributed cluster and the second distributed cluster, a broadcast message that is used to indicate that the node attribute of the device is a secondary node, a receiving unit (not shown) configured to receive a negotiation message sent by the second secondary node, where the negotiation message includes information that is used to indicate a weight of the second secondary node, and the negotiation message is sent by the second secondary node to the device 500 when it is detected that the node attribute indicated in the broadcast message sent by the first sending unit is the same as a node attribute of the second secondary node, a second sending unit (not shown) configured to send, to the second secondary node, a negotiation response message that is used to instruct to downgrade the second secondary node to a Slave node when a weight of the device 500 is greater than or equal to the weight of the second secondary node, and a third sending unit (not shown) configured to send, to all the nodes in the first distributed cluster and the second distributed cluster, a broadcast message that is used to indicate that the device 500 is downgraded to a Slave node when a weight of the device 500 is less than the weight of the second secondary node.

Therefore, the device 500 provided in this embodiment of the present disclosure can rapidly and effectively determine, according to a heartbeat message that is sent by a reference node and that is used to indicate that the reference node is disconnected from a Master node and a detection result detected by the device that a heartbeat message sent by the Master node is interrupted, that the Master node is faulty, which can effectively shorten a failure detection time of the Master node as compared with the other approaches.

It should be understood that the device 500 for processing a failure in at least one distributed cluster that is provided in this embodiment of the present disclosure may be corresponding to a secondary node in the method for processing a failure in at least one distributed cluster in the embodiments of the present disclosure, and the foregoing and other operations and/or functions of the modules in the device 500 are separately used for implementing corresponding procedures of the methods in FIG. 1 to FIG. 5. For brevity, details are not described herein again.

FIG. 8 shows a schematic block diagram of a device 600 for processing a failure in at least one distributed cluster according to an embodiment of the present disclosure. The at least one distributed cluster includes a first distributed cluster. The first distributed cluster includes a first Master node and a first Slave node. The first distributed cluster further includes a first reference node and a first secondary node that serves as a backup of the first Master node. The device 600 is the first Master node. The device 600 includes a first receiving module 610 configured to receive a heartbeat message that is sent by the first secondary node and that includes the third indication information, a first determining module 620 configured to determine, according to the third indication information received by the first receiving module 610, that the first secondary node is disconnected from the first Slave node, a first detection module 630 configured to detect whether a heartbeat message sent by the first Slave node to the device 600 is interrupted, a second determining module 640 configured to determine that the device 600 is also disconnected from the first Slave node when the first detection module 630 detects that the heartbeat message sent by the first Slave node to the device 600 is interrupted, and a third determining module 650 configured to determine, according to results of the determining by the first determining module 620 and the second determining module 640, that the first Slave node is faulty.

In the first distributed cluster, the first secondary node is configured to send the heartbeat message to the first Master node when it is detected that the heartbeat message sent by the first Slave node to the first secondary node is interrupted. The heartbeat message includes the third indication information that is used to indicate that the first secondary node is disconnected from the first Slave node.

In this embodiment of the present disclosure, in addition to a Master node and a Slave node, a distributed cluster further includes a reference node and a secondary node of the Master node. The Master node determines, according to a heartbeat message sent by the secondary node, that the secondary node is disconnected from the Slave node, and detects that a heartbeat message sent by the Slave node to the Master node is also interrupted, to determine that the Slave node is also disconnected from the Master node in order to effectively determine that the Slave node that is disconnected from both the Master node and the secondary node is faulty.

Therefore, in this embodiment of the present disclosure, the Master node can rapidly and effectively determine, according to a heartbeat message that is sent by a secondary node and that is used to indicate that the secondary node is disconnected from a Slave node and a detection result detected by the Master node that a heartbeat message sent by the Slave node is interrupted, that the Slave node is faulty. In comparison with an existing cluster failure processing solution, a failure detection time is effectively shortened, and power consumption of the Master node in a failure detection process can also be reduced.

Optionally, in this embodiment of the present disclosure, the first detection module 630 is further configured to detect whether a heartbeat message sent by the first Slave node is received between a third moment and a fourth moment. The third moment is a moment at which the device 600 receives the heartbeat message that is sent by the first secondary node and that includes the third indication information. The fourth moment is earlier than the third moment. A time interval between the third moment and the fourth moment is N times a heartbeat period of sending a heartbeat message by the first Slave node to the device 600, where N is a positive integer.

Optionally, in this embodiment of the present disclosure, the device 600 further includes a second detection module (not shown) configured to detect, within a preset detection period, whether a heartbeat message sent by the first secondary node and a heartbeat message sent by the first reference node are received, where the preset detection period is M times the heartbeat period of sending a heartbeat message, and M is a positive integer, and a fourth determining module (not shown) configured to determine that both the first secondary node and the first reference node are faulty when neither a heartbeat message sent by the first secondary node nor a heartbeat message sent by the first reference node is received by the second detection module within the preset detection period.

Optionally, in this embodiment of the present disclosure, the at least one distributed cluster further includes a second distributed cluster. The second distributed cluster includes a second Master node, a second Slave node, a second reference node, and a second secondary node that serves as a backup of the second Master node. The device 600 further includes a second receiving module (not shown) configured to receive a heartbeat message sent by the second reference node, where the heartbeat message includes fourth indication information that is used to indicate that a node attribute of a receive end of the heartbeat message is a Slave node, the second reference node is configured to separately send the heartbeat message that includes the fourth indication information to the second Slave node and all nodes in the first distributed cluster, and the second distributed cluster and the first distributed cluster have a same cluster identifier, a fifth determining module (not shown) configured to determine, according to the fourth indication information received by the second receiving module, that the node attribute that is of the receive end of the heartbeat message and that is indicated in the heartbeat message sent by the second reference node does not match a node attribute of the device 600, and determine that the second distributed cluster in which the second reference node is located and the first distributed cluster in which the device 600 is located are two sub-clusters formed after one network distributed cluster is split, and a negotiation module (not shown) configured to negotiate with the second Master node in the second distributed cluster, to integrate the first distributed cluster and the second distributed cluster.

Optionally, in this embodiment of the present disclosure, the negotiation module includes a first sending unit configured to send, to all nodes in the first distributed cluster and the second distributed cluster, a broadcast message that is used to indicate that the node attribute of the device 600 is a Master node, a receiving unit (not shown) configured to receive a negotiation message sent by the second Master node, where the negotiation message includes information that is used to indicate a weight of the second Master node, and the negotiation message is sent by the second Master node to the device 600 when it is detected that the node attribute indicated in the broadcast message sent by the first sending unit is the same as a node attribute of the second Master node, a second sending unit (not shown) configured to send, to the second Master node, a negotiation response message that is used to instruct to downgrade the second Master node to a Slave node when a weight of the device 600 is greater than or equal to the weight of the second Master node, and a third sending unit (not shown) configured to send, to all the nodes in the first distributed cluster and the second distributed cluster, a broadcast message that is used to indicate that the device 600 is downgraded to a Slave node when a weight of the device 600 is less than the weight of the second Master node.

Therefore, in this embodiment of the present disclosure, the Master node can rapidly and effectively determine, according to a heartbeat message that is sent by a secondary node and that is used to indicate that the secondary node is disconnected from a Slave node and a detection result detected by the Master node that a heartbeat message sent by the Slave node is interrupted, that the Slave node is faulty. In comparison with an existing cluster failure processing solution, a failure detection time is effectively shortened, and power consumption of the Master node in a failure detection process can also be reduced.

It should be understood that the device 600 for processing a failure in at least one distributed cluster that is provided in this embodiment of the present disclosure may be corresponding to a Master node in the method for processing a failure in at least one distributed cluster in the embodiments of the present disclosure, and the foregoing and other operations and/or functions of the modules in the device 600 are separately used for implementing corresponding procedures of the methods in FIG. 1 to FIG. 5. For brevity, details are not described herein again.

Figure 9:
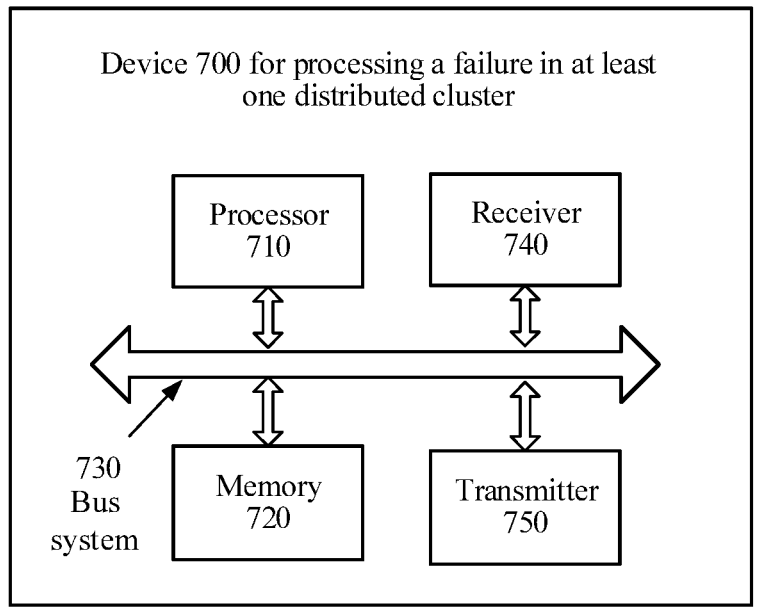
FIG. 9 shows still another schematic block diagram of a device for processing a failure in at least one distributed cluster according to an embodiment of the present disclosure.

As shown in FIG. 9, an embodiment of the present disclosure further provides a device 700 for processing a failure in at least one distributed cluster. The at least one distributed cluster includes a first distributed cluster. The first distributed cluster includes a first Master node and a first Slave node. The first distributed cluster further includes a first reference node and a first secondary node that serves as a backup of the first Master node. The device 700 is the first secondary node. The device 700 includes a processor 710, a memory 720, a bus system 730, a receiver 740, and a transmitter 750. The processor 710, the memory 720, the receiver 740, and the transmitter 750 are connected to each other using the bus system 730. The memory 720 is configured to store an instruction. The processor 710 is configured to execute the instruction stored in the memory 720, to control the receiver 740 to receive a signal and control the transmitter 750 to send a signal. The receiver 740 is configured to receive a heartbeat message sent by the first reference node. The heartbeat message includes first indication information that is used to indicate that the first reference node is disconnected from the first Master node. The processor 710 is configured to determine, according to the first indication information, that the first reference node is disconnected from the first Master node, detect whether a heartbeat message sent by the first Master node to the first secondary node is interrupted, determine that the first secondary node is also disconnected from the first Master node when it is detected that the heartbeat message sent by the first Master node to the first secondary node is interrupted, and determine that the first Master node that is disconnected from both the first secondary node and the first reference node is faulty.

Therefore, the device 700 provided in this embodiment of the present disclosure can rapidly and effectively determine, according to a heartbeat message that is sent by a reference node and that is used to indicate that the reference node is disconnected from a Master node and a detection result detected by the device 700 that a heartbeat message sent by the Master node is interrupted, that the Master node is faulty, which can effectively shorten a failure detection time of the Master node as compared with the other approaches.

Optionally, in this embodiment of the present disclosure, the transmitter 750 is further configured to send a broadcast message to all nodes in the first distributed cluster after the processor 710 determines that the first Master node is faulty. The broadcast message is used to indicate that the first secondary node is upgraded to a new first Master node.

Optionally, in this embodiment of the present disclosure, the processor 710 is further configured to detect whether a heartbeat message sent by the first Master node is received between a first moment and a second moment. The first moment is a moment at which the first secondary node receives the heartbeat message that is sent by the first reference node and that includes the first indication information. The second moment is earlier than the first moment. A time interval between the first moment and the second moment is N times a heartbeat period of sending a heartbeat message by the first Master node to the first secondary node, where N is a positive integer.

Optionally, in this embodiment of the present disclosure, the at least one distributed cluster further includes a second distributed cluster. The second distributed cluster includes a second Master node, a second Slave node, a second reference node, and a second secondary node that serves as a backup of the second Master node. The receiver 740 is configured to receive a heartbeat message sent by the second reference node. The heartbeat message includes second indication information that is used to indicate that a node attribute of a receive end of the heartbeat message is a Slave node. The second reference node is configured to separately send the heartbeat message that includes the second indication information to the second Slave node and all the nodes in the first distributed cluster. The second distributed cluster and the first distributed cluster have a same cluster identifier. The processor 710 is configured to determine, according to the second indication information, that the node attribute that is of the receive end of the heartbeat message and that is indicated in the heartbeat message sent by the second reference node does not match a node attribute of the first secondary node, determine that the second distributed cluster in which the second reference node is located and the first distributed cluster in which the first secondary node is located are two sub-clusters formed after one network distributed cluster is split, and negotiate with the second secondary node in the second distributed cluster, to integrate the first distributed cluster and the second distributed cluster.

Optionally, in this embodiment of the present disclosure, the transmitter 750 is configured to send, to all nodes in the first distributed cluster and the second distributed cluster, a broadcast message that is used to indicate that the node attribute of the first secondary node is a secondary node. The receiver 740 is configured to receive a negotiation message sent by the second secondary node. The negotiation message includes information that is used to indicate a weight of the second secondary node, and the negotiation message is sent by the second secondary node to the first secondary node when it is detected that the node attribute indicated in the broadcast message is the same as a node attribute of the second secondary node. The transmitter 750 is configured to send, to the second secondary node, a negotiation response message that is used to instruct to downgrade the second secondary node to a Slave node when a weight of the first secondary node is greater than or equal to the weight of the second secondary node, or send, to all the nodes in the first distributed cluster and the second distributed cluster, a broadcast message that is used to indicate that the first secondary node is downgraded to a Slave node when a weight of the first secondary node is less than the weight of the second secondary node.

It should be understood that, in this embodiment of the present disclosure, the processor 710 may be a central processing unit (CPU), or the processor 710 may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor 710 may be any conventional processor, or the like.

The memory 720 may include a read-only memory (ROM) and a random access memory (RAM), and provides an instruction and data to the processor 710. A part of the memory 720 may further include a non-volatile RAM. For example, the memory 720 may further store information about a device type.

In addition to a data bus, the bus system 730 may further include a power bus, a control bus, a status signal bus, and the like. However, for clear description, all types of buses are marked as the bus system 730 in the FIG. 9.

In an implementation process, the steps of the foregoing methods may be completed by an integrated logic circuit of hardware in the processor 710 or by an instruction in a form of software. The steps of the methods disclosed with reference to the embodiments of the present disclosure may be directly executed and completed by a hardware processor, or may be executed and completed by a combination of hardware and software modules in the processor 710. The software module may be located in a mature storage medium in the other approaches, such as a RAM, a flash memory, a ROM, a programmable ROM (PROM), an electrically-erasable programmable ROM (EEPROM), a register, or the like. The storage medium is located in the memory 720. The processor 710 reads information from the memory 720, and completes the steps in the foregoing methods in combination with hardware of the processor 710. To avoid repetition, details are not described herein again.

Therefore, the device 700 provided in this embodiment of the present disclosure can rapidly and effectively determine, according to a heartbeat message that is sent by a reference node and that is used to indicate that the reference node is disconnected from a Master node and a detection result detected by the device 700 that a heartbeat message sent by the Master node is interrupted, that the Master node is faulty, which can effectively shorten a failure detection time of the Master node as compared with the other approaches.

It should be understood that the device 700 for processing a failure in at least one distributed cluster that is provided in this embodiment of the present disclosure may be corresponding to the secondary node in the methods for processing a failure in at least one distributed cluster in the embodiments of the present disclosure, and be corresponding to the device 500 for processing a failure in at least one distributed cluster that is provided in the embodiments of the present disclosure. In addition, the foregoing and other operations and/or functions of the modules in the device 700 are separately used for implementing corresponding procedures of the methods in FIG. 1 to FIG. 5. For brevity, details are not described herein again.

Figure 10:
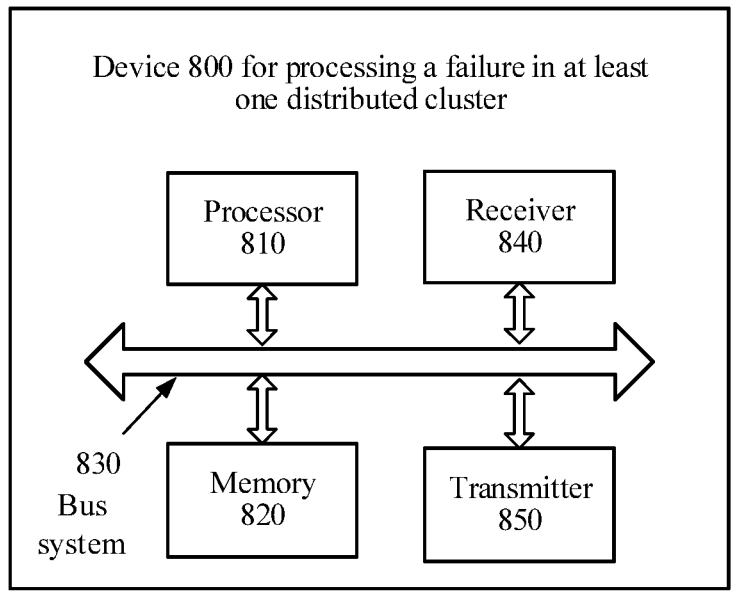
FIG. 10 shows yet another schematic block diagram of a device for processing a failure in at least one distributed cluster according to an embodiment of the present disclosure.

As shown in FIG. 10, an embodiment of the present disclosure further provides a device 800 for processing a failure in at least one distributed cluster. The at least one distributed cluster includes a first distributed cluster. The first distributed cluster includes a first Master node and a first Slave node. The first distributed cluster further includes a first reference node and a first secondary node that serves as a backup of the first Master node. The device 800 is the first Master node. The device 800 includes a processor 810, a memory 820, a bus system 830, a receiver 840, and a transmitter 850. The processor 810, the memory 820, the receiver 840, and the transmitter 850 are connected to each other using the bus system 830. The memory 820 is configured to store an instruction. The processor 810 is configured to execute the instruction stored in the memory 820, to control the receiver 840 to receive a signal and control the transmitter 850 to send a signal. The receiver 840 is configured to receive a heartbeat message sent by the first secondary node. The heartbeat message includes third indication information that is used to indicate that the first secondary node is disconnected from the first Slave node. The processor 810 is configured to determine, according to the third indication information, that the first secondary node is disconnected from the first Slave node, detect whether a heartbeat message sent by the first Slave node to the first Master node is interrupted, determine that the first Master node is also disconnected from the first Slave node when it is detected that the heartbeat message sent by the first Slave node to the first Master node is interrupted, and determine that the first Slave node that is disconnected from both the first Master node and the first secondary node is faulty.

Therefore, in this embodiment of the present disclosure, the Master node can rapidly and effectively determine, according to a heartbeat message that is sent by a secondary node and that is used to indicate that the secondary node is disconnected from a Slave node and a detection result detected by the Master node that a heartbeat message sent by the Slave node is interrupted, that the Slave node is faulty. In comparison with an existing cluster failure processing solution, a failure detection time is effectively shortened, and power consumption of the Master node in a failure detection process can also be reduced.

Optionally, in this embodiment of the present disclosure, the processor 810 is configured to detect whether a heartbeat message sent by the first Slave node is received between a third moment and a fourth moment. The third moment is a moment at which the first Master node receives the heartbeat message that is sent by the first secondary node and that includes the third indication information. The fourth moment is earlier than the third moment. A time interval between the third moment and the fourth moment is N times a heartbeat period of sending a heartbeat message by the first Slave node to the first Master node, where N is a positive integer.

Optionally, in this embodiment of the present disclosure, the processor 810 is configured to detect, within a preset detection period, whether a heartbeat message sent by the first secondary node and a heartbeat message sent by the first reference node are received, where the preset detection period is M times the heartbeat period of sending a heartbeat message, and M is a positive integer, and determine that both the first secondary node and the first reference node are faulty when neither a heartbeat message sent by the first secondary node nor a heartbeat message sent by the first reference node is received within the preset detection period.

Optionally, in this embodiment of the present disclosure, the at least one distributed cluster further includes a second distributed cluster. The second distributed cluster includes a second Master node, a second Slave node, a second reference node, and a second secondary node that serves as a backup of the second Master node. The receiver 840 is configured to receive a heartbeat message sent by the second reference node. The heartbeat message includes fourth indication information that is used to indicate that a node attribute of a receive end of the heartbeat message is a Slave node. The second reference node is configured to separately send the heartbeat message that includes the fourth indication information to the second Slave node and all nodes in the first distributed cluster. The second distributed cluster and the first distributed cluster have a same cluster identifier. The processor 810 is configured to determine, according to the fourth indication information, that the node attribute that is of the receive end of the heartbeat message and that is indicated in the heartbeat message sent by the second reference node does not match a node attribute of the first Master node, determine that the second distributed cluster in which the second reference node is located and the first distributed cluster in which the first Master node is located are two sub-clusters formed after one network distributed cluster is split, and negotiate with the second Master node in the second distributed cluster, to integrate the first distributed cluster and the second distributed cluster.

Optionally, in this embodiment of the present disclosure, the transmitter 850 is configured to send, to all nodes in the first distributed cluster and the second distributed cluster, a broadcast message that is used to indicate that the node attribute of the first Master node is a Master node. The receiver 840 is configured to receive a negotiation message sent by the second Master node. The negotiation message includes information that is used to indicate a weight of the second Master node, and the negotiation message is sent by the second Master node to the first Master node when it is detected that the node attribute indicated in the broadcast message is the same as a node attribute of the second Master node. The transmitter 850 is configured to send, to the second Master node, a negotiation response message that is used to instruct to downgrade the second Master node to a Slave node when a weight of the first Master node is greater than or equal to the weight of the second Master node, or send, to all the nodes in the first distributed cluster and the second distributed cluster, a broadcast message that is used to indicate that the first Master node is downgraded to a Slave node when a weight of the first Master node is less than the weight of the second Master node.

Therefore, in this embodiment of the present disclosure, the Master node can rapidly and effectively determine, according to a heartbeat message that is sent by a secondary node and that is used to indicate that the secondary node is disconnected from a Slave node and a detection result detected by the Master node that a heartbeat message sent by the Slave node is interrupted, that the Slave node is faulty. In comparison with an existing cluster failure processing solution, a failure detection time is effectively shortened, and power consumption of the Master node in a failure detection process can also be reduced.

It should be understood that the device 800 for processing a failure in at least one distributed cluster that is provided in this embodiment of the present disclosure may be corresponding to the Master node in the methods for processing a failure in at least one distributed cluster in the embodiments of the present disclosure, and may be corresponding to the device 600 for processing a failure in at least one distributed cluster that is provided in the embodiments of the present disclosure. In addition, the foregoing and other operations and/or functions of the modules in the device 800 are separately used for implementing corresponding procedures of the methods in FIG. 1 to FIG. 5. For brevity, details are not described herein again.

Figure 11:
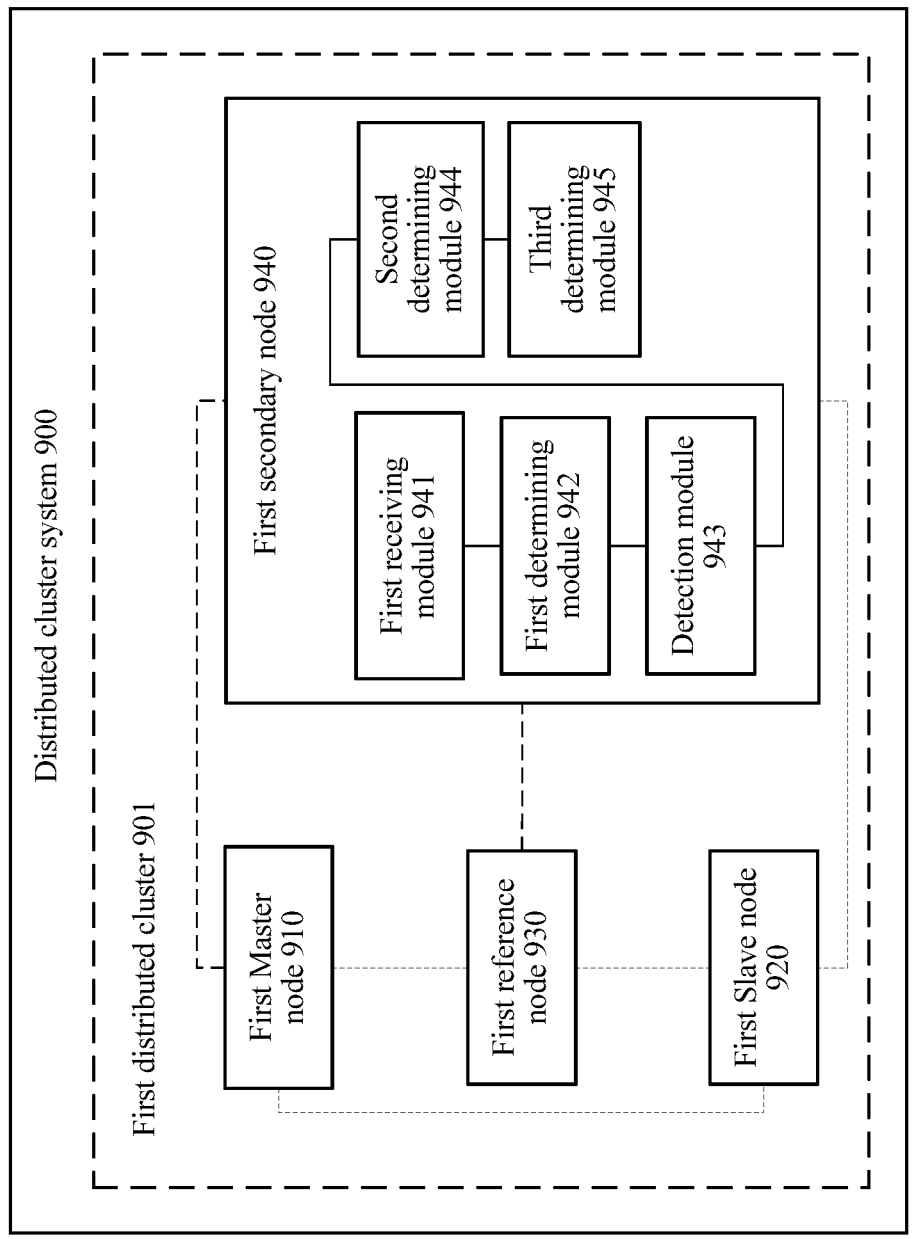
FIG. 11 shows a schematic block diagram of a distributed cluster system according to an embodiment of the present disclosure.

FIG. 11 shows a schematic block diagram of a distributed cluster system 900 according to an embodiment of the present disclosure. The distributed cluster system 900 includes a first distributed cluster 901. The first distributed cluster 901 includes a first Master node 910 and a first Slave node 920. The first distributed cluster 901 further includes a first reference node 930 and a first secondary node 940 that serves as a backup of the first Master node 910. The first Master node 910, the first secondary node 940, and the first reference node 930 are configured to send a heartbeat message to each other. The first reference node 930 is further configured to send a heartbeat message to the first Slave node 920. The first Slave node 920 is configured to separately send a heartbeat message to the first Master node 910 and the first secondary node 940.

The first reference node 930 is further configured to send a heartbeat message to the first secondary node 940 when it is detected that the heartbeat message sent by the first Master node 910 to the first reference node 930 is interrupted. The heartbeat message includes first indication information that is used to indicate that the first reference node 930 is disconnected from the first Master node 910.

The first secondary node 940 includes a first receiving module 941 configured to receive the heartbeat message that is sent by the first reference node 930 and that includes the first indication information, a first determining module 942 configured to determine, according to the first indication information received by the first receiving module 941, that the first reference node 930 is disconnected from the first Master node 910, a detection module 943 configured to detect whether a heartbeat message sent by the first Master node 910 to the first secondary node 940 is interrupted, a second determining module 944 configured to determine that the first secondary node 940 is also disconnected from the first Master node 910 when the detection module 943 detects that the heartbeat message sent by the first Master node 910 to the first secondary node 940 is interrupted, and a third determining module 945 configured to determine, according to results of the determining by the first determining module 942 and the second determining module 944, that the first Master node 910 is faulty.

Further, the first distributed cluster may be corresponding to the distributed cluster 100 shown in FIG. 1. For specific description, refer to the foregoing. For brevity, details are not described herein again.

In this embodiment of the present disclosure, in addition to a Master node and a Slave node, the first distributed cluster 901 further includes a reference node and a secondary node of the Master node. The secondary node determines, according to a heartbeat message sent by the reference node, that the Master node is disconnected from the reference node, and detects that a heartbeat message sent by the Master node to the secondary node is also interrupted, to determine that the Master node is also disconnected from the secondary node in order to effectively determine that the Master node that is disconnected from both the secondary node and the reference node is faulty. In this embodiment of the present disclosure, the secondary node can rapidly and effectively determine, according to the heartbeat message that is sent by the reference node and that is used to indicate that the reference node is disconnected from the Master node and a detection result detected by the secondary node that a heartbeat message sent by the Master node is interrupted, that the Master node is faulty, which can effectively shorten a failure detection time of the Master node as compared with the other approaches.

Optionally, in an embodiment, the first secondary node 940 further includes a sending module (not shown) configured to send a broadcast message to all nodes in the first distributed cluster 901 when the third determining module 945 determines that the first Master node 910 is faulty, where the broadcast message is used to indicate that the first secondary node 940 is upgraded to a new first Master node.

Optionally, in an embodiment, the detection module 943 is further configured to detect whether a heartbeat message sent by the first Master node 910 is received between a first moment and a second moment. The first moment is a moment at which the first secondary node 940 receives the heartbeat message that is sent by the first reference node 930 and that includes the first indication information. The second moment is earlier than the first moment. A time interval between the first moment and the second moment is N times a heartbeat period of sending a heartbeat message by the first Master node 910 to the first secondary node 940, where N is a positive integer.

Optionally, in an embodiment, the distributed cluster system 900 further includes a second distributed cluster. The second distributed cluster includes a second Master node, a second Slave node, a second reference node, and a second secondary node that serves as a backup of the second Master node. The first secondary node further includes a second receiving module configured to receive a heartbeat message sent by the second reference node, where the heartbeat message includes second indication information that is used to indicate that a node attribute of a receive end of the heartbeat message is a Slave node, the second reference node is configured to separately send the heartbeat message that includes the second indication information to the second Slave node and all the nodes in the first distributed cluster 901, and the second distributed cluster and the first distributed cluster 901 have a same cluster identifier, a fourth determining module (not shown) configured to determine, according to the second indication information received by the second receiving module, that the node attribute that is of the receive end of the heartbeat message and that is indicated in the heartbeat message sent by the second reference node does not match a node attribute of the first secondary node 940, and determine that the second distributed cluster in which the second reference node is located and the first distributed cluster 901 in which the first secondary node 940 is located are two sub-clusters formed after one network distributed cluster is split, and a negotiation module (not shown) configured to negotiate with the second secondary node in the second distributed cluster to integrate the first distributed cluster 901 and the second distributed cluster.

Optionally, in an embodiment, the negotiation module includes a first sending unit (not shown) configured to send, to all nodes in the first distributed cluster 901 and the second distributed cluster, a broadcast message that is used to indicate that the node attribute of the first secondary node is a secondary node, a receiving unit configured to receive a negotiation message sent by the second secondary node, where the negotiation message includes information that is used to indicate a weight of the second secondary node, and the negotiation message is sent by the second secondary node to the device when it is detected that the node attribute indicated in the broadcast message sent by the first sending unit is the same as a node attribute of the second secondary node, a second sending unit (not shown) configured to send, to the second secondary node, a negotiation response message that is used to instruct to downgrade the second secondary node to a Slave node when a weight of the first secondary node 940 is greater than or equal to the weight of the second secondary node, and a third sending unit (not shown) configured to send, to all the nodes in the first distributed cluster 901 and the second distributed cluster, a broadcast message that is used to indicate that the first secondary node is downgraded to a Slave node when a weight of the first secondary node 940 is less than the weight of the second secondary node.

Therefore, in this embodiment of the present disclosure, the distributed cluster includes a Master node, a Slave node, a reference node, and a secondary node of the Master node. The secondary node determines, according to a heartbeat message sent by the reference node, that the Master node is disconnected from the reference node, and detects that a heartbeat message sent by the Master node to the secondary node is also interrupted, to determine that the Master node is also disconnected from the secondary node in order to effectively determine that the Master node that is disconnected from both the secondary node and the reference node is faulty. In this embodiment of the present disclosure, the secondary node can rapidly and effectively determine, according to the heartbeat message that is sent by the reference node and that is used to indicate that the reference node is disconnected from the Master node and a detection result detected by the secondary node that a heartbeat message sent by the Master node is interrupted, that the Master node is faulty, which can effectively shorten a failure detection time of the Master node as compared with the other approaches.

It should be understood that the first distributed cluster 901 in the distributed cluster system 900 that is provided in this embodiment of the present disclosure may be corresponding to the first distributed cluster in the methods for processing a failure in a distributed cluster that are provided in the embodiments of the present disclosure, and the first secondary node 940 in the distributed cluster system 900 corresponds to the device 700 for processing a failure in a distributed cluster that is provided in the embodiments of the present disclosure. In addition, the foregoing and other operations and/or functions of the modules in the distributed cluster system 900 are separately used for implementing corresponding procedures of the methods in FIG. 1 to FIG. 5. For brevity, details are not described herein again.

Figure 12:
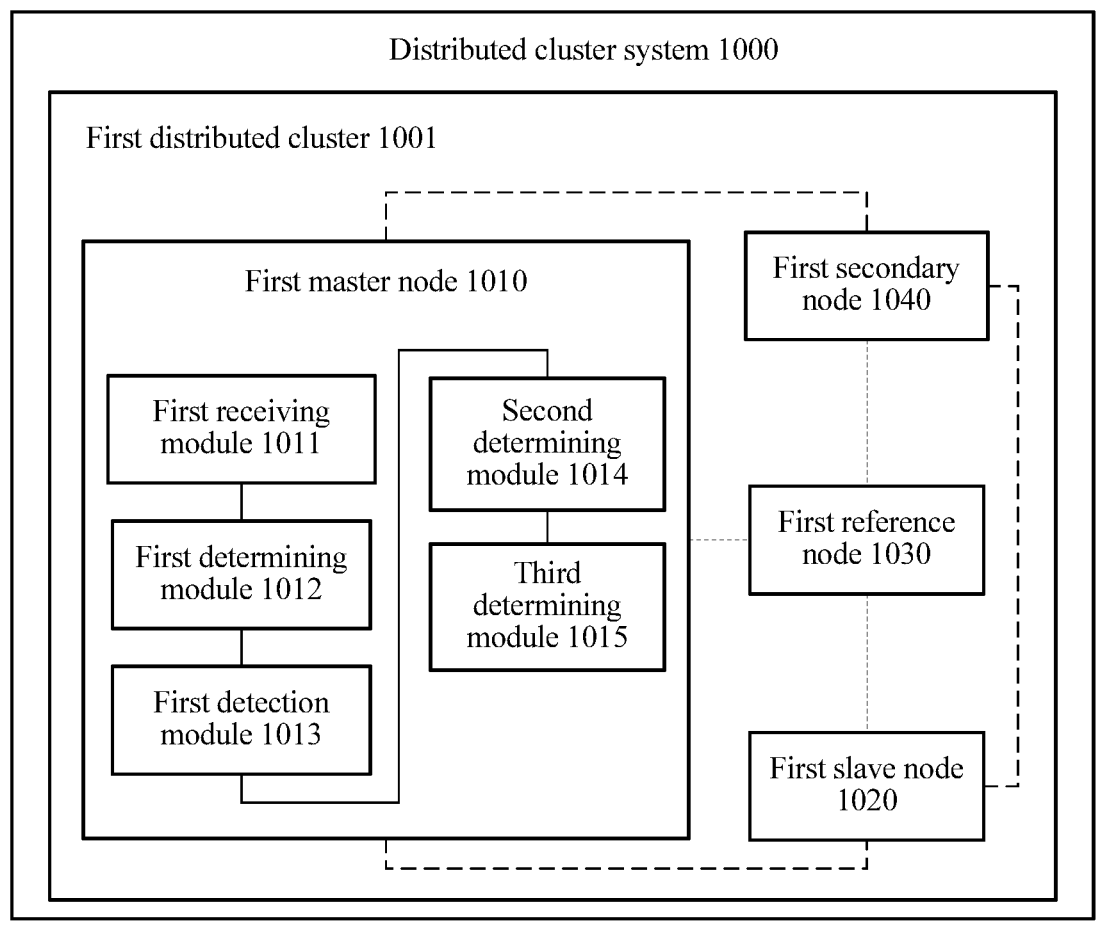
FIG. 12 shows another schematic block diagram of a distributed cluster system according to an embodiment of the present disclosure.

FIG. 12 shows a distributed cluster system 1000 according to an embodiment of the present disclosure. The distributed cluster system 1000 includes a first distributed cluster 1001. The first distributed cluster 1001 includes a first Master node 1010 and a first Slave node 1020. The first distributed cluster 1001 further includes a first reference node 1030 and a first secondary node 1040 that serves as a backup of the first Master node 1010. The first Master node 1010, the first secondary node 1040, and the first reference node 1030 are configured to send a heartbeat message to each other. The first reference node 1030 is further configured to send a heartbeat message to the first Slave node 1020. The first Slave node 1020 is configured to separately send a heartbeat message to the first Master node 1010 and the first secondary node 1040.

The first secondary node 1040 is further configured to send a heartbeat message to the first Master node 1010 when it is detected that the heartbeat message sent by the first Slave node 1020 to the first secondary node 1040 is interrupted. The heartbeat message includes third indication information that is used to indicate that the first secondary node 1040 is disconnected from the first Slave node 1020.

The first Master node 1010 includes a first receiving module 1011 configured to receive the heartbeat message that is sent by the first secondary node 1040 and that includes the third indication information, a first determining module 1012 configured to determine, according to the third indication information received by the first receiving module 1011, that the first secondary node 1040 is disconnected from the first Slave node 1020, a first detection module 1013 configured to detect whether a heartbeat message sent by the first Slave node 1020 to the first Master node 1010 is interrupted, a second determining module 1014 configured to determine that the first Master node 1010 is also disconnected from the first Slave node 1020 when the first detection module 1013 detects that the heartbeat message sent by the first Slave node 1020 to the first Master node 1010 is interrupted, and a third determining module 1015 configured to determine, according to results of the determining by the first determining module 1012 and the second determining module 1014, that the first Slave node 1020 is faulty.

In this embodiment of the present disclosure, in addition to a Master node and a Slave node, a distributed cluster further includes a reference node and a secondary node of the Master node. The Master node determines, according to a heartbeat message sent by the secondary node, that the secondary node is disconnected from the Slave node, and detects that a heartbeat message sent by the Slave node to the Master node is also interrupted, to determine that the Slave node is also disconnected from the Master node in order to effectively determine that the Slave node that is disconnected from both the Master node and the secondary node is faulty.

Therefore, in the distributed cluster system 1000 provided in this embodiment of the present disclosure, the Master node can rapidly and effectively determine, according to a heartbeat message that is sent by a secondary node and that is used to indicate that the secondary node is disconnected from a Slave node and a detection result detected by the Master node that a heartbeat message sent by the Slave node is interrupted, that the Slave node is faulty. In comparison with the other approaches, a failure detection time of the Slave node can be effectively shortened, and failure detection accuracy can also be improved.

Optionally, in an embodiment, the first detection module 1013 is further configured to detect whether a heartbeat message sent by the first Slave node 1020 is received between a third moment and a fourth moment. The third moment is a moment at which the first Master node 1010 receives the heartbeat message that is sent by the first secondary node 1040 and that includes the third indication information. The fourth moment is earlier than the third moment. A time interval between the third moment and the fourth moment is N times a heartbeat period of sending a heartbeat message by the first Slave node 1020 to the first Master node 1010, where N is a positive integer.

Optionally, in an embodiment, the first Master node 1010 further includes a second detection module (not shown) configured to detect, within a preset detection period, whether a heartbeat message sent by the first secondary node 1040 and a heartbeat message sent by the first reference node 1030 are received, where the preset detection period is M times the heartbeat period of sending a heartbeat message, and M is a positive integer, and a fourth determining module (not shown) configured to determine that both the first secondary node 1040 and the first reference node 1030 are faulty when neither a heartbeat message sent by the first secondary node 1040 nor a heartbeat message sent by the first reference node 1030 is received by the second detection module within the preset detection period.

Optionally, in an embodiment, the distributed cluster system 1000 further includes a second distributed cluster. The second distributed cluster includes a second Master node, a second Slave node, a second reference node, and a second secondary node that serves as a backup of the second Master node. The first Master node 1010 further includes a second receiving module (not shown) configured to receive a heartbeat message sent by the second reference node, where the heartbeat message includes fourth indication information that is used to indicate that a node attribute of a receive end of the heartbeat message is a Slave node, the second reference node is configured to separately send the heartbeat message that includes the fourth indication information to the second Slave node and all nodes in the first distributed cluster 1001, and the second distributed cluster and the first distributed cluster 1001 have a same cluster identifier, a fifth determining module (not shown) configured to determine, according to the fourth indication information received by the second receiving module, that the node attribute that is of the receive end of the heartbeat message and that is indicated in the heartbeat message sent by the second reference node does not match a node attribute of the first Master node 1010, and determine that the second distributed cluster in which the second reference node is located and the first distributed cluster 1001 in which the first Master node 1010 is located are two sub-clusters formed after one network distributed cluster is split, and a negotiation module (not shown) configured to negotiate with the second Master node in the second distributed cluster to integrate the first distributed cluster 1001 and the second distributed cluster.

Optionally, in an embodiment, the negotiation module includes a first sending unit (not shown) configured to send, to all nodes in the first distributed cluster 1001 and the second distributed cluster, a broadcast message that is used to indicate that the node attribute of the first Master node 1010 is a Master node, a receiving unit (not shown) configured to receive a negotiation message sent by the second Master node, where the negotiation message includes information that is used to indicate a weight of the second Master node, and the negotiation message is sent by the second Master node to the first Master node 1010 when it is detected that the node attribute indicated in the broadcast message sent by the first sending unit is the same as a node attribute of the second Master node, a second sending unit (not shown) configured to send, to the second Master node, a negotiation response message that is used to instruct to downgrade the second Master node to a Slave node when a weight of the first Master node 1010 is greater than or equal to the weight of the second Master node, and a third sending unit (not shown) configured to send, to all the nodes in the first distributed cluster 1001 and the second distributed cluster, a broadcast message that is used to indicate that the first Master node 1010 is downgraded to a Slave node when a weight of the first Master node 1010 is less than the weight of the second Master node.

Therefore, in the distributed cluster system 1000 provided in this embodiment of the present disclosure, a Master node can rapidly and effectively determine, according to a heartbeat message that is sent by a secondary node and that is used to indicate that the secondary node is disconnected from the Slave node and a detection result detected by the Master node that a heartbeat message sent by the Slave node is interrupted, that the Slave node is faulty. In comparison with the other approaches, a failure detection time of the Slave node can be effectively shortened, and failure detection accuracy can also be improved.

It should be understood that the first distributed cluster 1001 in the distributed cluster system 1000 that is provided in this embodiment of the present disclosure may be corresponding to the first distributed cluster in the methods for processing a failure in a distributed cluster that are provided in the embodiments of the present disclosure, and the first Master node 1010 in the distributed cluster system 1000 corresponds to the device 800 for processing a failure in a distributed cluster that is provided in the embodiments of the present disclosure. In addition, the foregoing and other operations and/or functions of the modules in the distributed cluster system 1000 are separately used for implementing corresponding procedures of the methods in FIG. 1 to FIG. 5. For brevity, details are not described herein again.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for processing a failure in at least one distributed cluster, comprising:
   receiving, by a first secondary node, a first heartbeat message from a first reference node, wherein the first heartbeat message comprises first indication information indicating that the first reference node is disconnected from a first Master node;
   determining, by the first secondary node according to the first indication information, that the first reference node is disconnected from the first Master node;
   detecting, by the first secondary node, whether a second heartbeat message from the first Master node to the first secondary node is interrupted;
   determining, by the first secondary node, that the first secondary node is also disconnected from the first Master node when the second heartbeat message from the first Master node to the first secondary node is interrupted;
   determining, by the first secondary node, that the first Master node disconnected from both the first secondary node and the first reference node is faulty, wherein the at least one distributed cluster comprises a first distributed cluster, and wherein the first distributed cluster comprises the first Master node, a first Slave node, the first reference node, and the first secondary node that serves as a backup of the first Master node; and
   sending, by the first secondary node, a broadcast message to all nodes in the first distributed cluster in response to the first Master node being faulty, wherein the broadcast message indicates that the first secondary node is upgraded to a new first Master node.

2. The method of claim 1, wherein detecting whether the second heartbeat message from the first Master node to the first secondary node is interrupted comprises detecting, by the first secondary node, whether the second heartbeat message from the first Master node is received between a first moment and a second moment, wherein the first moment is a moment at which the first secondary node receives the first heartbeat message from the first reference node comprising the first indication information, wherein the second moment is earlier than the first moment, wherein a time interval between the first moment and the second moment is N times a heartbeat period of sending the second heartbeat message by the first Master node to the first secondary node, and wherein N is a positive integer.

3. The method of claim 1, wherein the at least one distributed cluster further comprises a second distributed cluster, and wherein the method further comprises:
   receiving, by the first secondary node, a heartbeat message from a second reference node, wherein the heartbeat message comprises second indication information indicating that a node attribute of a receive end of the heartbeat message is a Slave node, wherein the second reference node is configured to separately send the heartbeat message comprising the second indication information to a second Slave node and all the nodes in the first distributed cluster, and wherein the second distributed cluster and the first distributed cluster have a same cluster identifier;
   determining, by the first secondary node according to the second indication information, that the node attribute of the receive end of the heartbeat message indicated in the heartbeat message from the second reference node does not match a node attribute of the first secondary node;
   determining, by the first secondary node, that the second distributed cluster in which the second reference node is located and the first distributed cluster in which the first secondary node is located are two sub-clusters formed after one network distributed cluster is split; and
   negotiating, by the first secondary node, with a second secondary node in the second distributed cluster to integrate the first distributed cluster and the second distributed cluster, and wherein the second distributed cluster comprises a second Master node, a second Slave node, the second reference node, and the second secondary node that serves as a backup of the second Master node.

4. The method of claim 3, wherein negotiating with the second secondary node in the second distributed cluster comprises:
   sending, by the first secondary node to all nodes in the first distributed cluster and the second distributed cluster, a broadcast message indicating that the node attribute of the first secondary node is a secondary node;
   receiving, by the first secondary node, a negotiation message from the second secondary node, wherein the negotiation message comprises information indicating a weight of the second secondary node, and wherein the negotiation message is sent by the second secondary node to the first secondary node when it is detected that the node attribute indicated in the broadcast message is the same as a node attribute of the second secondary node;
   sending, by the first secondary node to the second secondary node, a negotiation response message instructing to downgrade the second secondary node to a Slave node when a weight of the first secondary node is greater than or equal to the weight of the second secondary node; and
   sending, by the first secondary node to all the nodes in the first distributed cluster and the second distributed cluster, a broadcast message indicating that the first secondary node is downgraded to a Slave node when the weight of the first secondary node is less than the weight of the second secondary node.

5. A method for processing a failure in at least one distributed cluster, comprising:

receiving, by a first Master node, a first heartbeat message from a first secondary node, wherein the first heartbeat message comprises third indication information indicating that the first secondary node is disconnected from a first Slave node;

determining, by the first Master node according to the third indication information, that the first secondary node is disconnected from the first Slave node;

detecting, by the first Master node, whether a second heartbeat message from the first Slave node to the first Master node is interrupted based on whether the second heartbeat message from the first Slave node is received between a third moment and a fourth moment, wherein the third moment is a moment at which the first Master node receives the first heartbeat message from the first secondary node comprising the third indication information, wherein the fourth moment is earlier than the third moment, wherein a time interval between the third moment and the fourth moment is N times a heartbeat period of sending the second heartbeat message by the first Slave node to the first Master node, and wherein N is a positive integer;

determining, by the first Master node, that the first Master node is also disconnected from the first Slave node when it is detected that the second heartbeat message from the first Slave node to the first Master node is interrupted; and determining, by the first Master node, that the first Slave node disconnected from both the first Master node and the first secondary node is faulty, wherein the at least one distributed cluster comprises a first distributed cluster, and wherein the first distributed cluster comprises the first Master node, the first Slave node, a first reference node, and the first secondary node that serves as a backup of the first Master node.

6. The method of claim 5, further comprising:

detecting, by the first Master node, whether the heartbeat message from the first secondary node and a heartbeat message from the first reference node are received within a preset detection period, wherein the preset detection period is M times the heartbeat period of sending a heartbeat message, and wherein M is a positive integer; and determining, by the first Master node, that both the first secondary node and the first reference node are faulty when neither the heartbeat message from the first secondary node nor the heartbeat message from the first reference node is received within the preset detection period.

7. The method of claim 5, wherein the at least one distributed cluster further comprises a second distributed cluster, and wherein the method further comprises:

receiving, by the first Master node, a heartbeat message from a second reference node, wherein the heartbeat message from the second reference node comprises fourth indication information indicating that a node attribute of a receive end of the heartbeat message is a Slave node, wherein the second reference node is configured to separately send the heartbeat message comprising the fourth indication information to a second Slave node and all nodes in the first distributed cluster, and wherein the second distributed cluster and the first distributed cluster have a same cluster identifier;

determining, by the first Master node according to the fourth indication information, that the node attribute of the receive end of the heartbeat message indicated in the heartbeat message from the second reference node does not match a node attribute of the first Master node;

determining, by the first Master node, that the second distributed cluster in which the second reference node is located and the first distributed cluster in which the first Master node is located are two sub-clusters formed after one network distributed cluster is split; and negotiating, by the first Master node, with a second Master node in the second distributed cluster to integrate the first distributed cluster and the second distributed cluster, and wherein the second distributed cluster comprises the second Master node, the second Slave node, the second reference node, and a second secondary node that serves as a backup of the second Master node.

8. The method of claim 7, wherein negotiating with the second Master node in the second distributed cluster comprises:

sending, by the first Master node to all nodes in the first distributed cluster and the second distributed cluster, a broadcast message indicating that the node attribute of the first Master node is a Master node;

receiving, by the first Master node, a negotiation message from the second Master node, wherein the negotiation message comprises information indicating a weight of the second Master node, and wherein the negotiation message is sent by the second Master node to the first Master node when it is detected that the node attribute indicated in the broadcast message is the same as a node attribute of the second Master node;

sending, by the first Master node to the second Master node, a negotiation response message instructing to downgrade the second Master node to a Slave node when a weight of the first Master node is greater than or equal to the weight of the second Master node; and sending, by the first Master node to all the nodes in the first distributed cluster and the second distributed cluster, a broadcast message indicating that the first Master node is downgraded to a Slave node when the weight of the first Master node is less than the weight of the second Master node.

9. A device for processing a failure in at least one distributed cluster, comprising:

a first receiver configured to receive a first heartbeat message comprising a first indication information from a first reference node;

a processor coupled to the first receiver and configured to:
determine, according to the first indication information received by the first receiver, that the first reference node is disconnected from a first Master node;
detect whether a second heartbeat message from the first Master node to the device is interrupted;
determine that the device is also disconnected from the first Master node when the heartbeat message from the first Master node to the device is interrupted; and
determine, that the first Master node is faulty, wherein the at least one distributed cluster comprises a first distributed cluster, wherein the first distributed cluster comprises the first Master node, a first Slave node, the first reference node, and a first secondary node that serves as a backup of the first Master node, and wherein the device is the first secondary node; and a transmitter coupled to the processor and the first receiver and configured to send a broadcast message to all nodes in the first distributed cluster in response to the processor determining that the first Master node is faulty, wherein the broadcast message indicates that the device is upgraded to a new first Master node.

10. The device of claim 9, wherein the processor is further configured to detect whether the second heartbeat message from the first Master node is received between a first moment and a second moment, wherein the first moment is a moment at which the device receives the first heartbeat message from the first reference node comprising the first indication information, wherein the second moment is earlier than the first moment, wherein a time interval between the first moment and the second moment is N times a heartbeat period of sending a second heartbeat message by the first Master node to the device, and wherein N is a positive integer.

11. The device of claim 9, wherein the at least one distributed cluster further comprises a second distributed cluster, wherein the device further comprises a second receiver coupled to the processor, the first receiver, and the transmitter and configured to receive a heartbeat message from a second reference node, wherein the heartbeat message comprises second indication information indicating that a node attribute of a receive end of the heartbeat message is a Slave node, wherein the second reference node is configured to separately send the heartbeat message comprising the second indication information to a second Slave node and all nodes in the first distributed cluster, wherein the second distributed cluster and the first distributed cluster have a same cluster identifier, and wherein the processor is further configured to:
  determine, according to the second indication information received by the second receiver, that the node attribute of the receive end of the heartbeat message indicated in the heartbeat message from the second reference node does not match a node attribute of the device;
  determine that the second distributed cluster in which the second reference node is located and the first distributed cluster in which the device is located are two sub-clusters formed after one network distributed cluster is split; and
  negotiate with a second secondary node in the second distributed cluster to integrate the first distributed cluster and the second distributed cluster, and wherein the second distributed cluster comprises a second Master node, the second Slave node, the second reference node, and the second secondary node that serves as a backup of the second Master node.

12. The device of claim 11, wherein the processor is further configured to:
  send, to all nodes in the first distributed cluster and the second distributed cluster, a broadcast message indicating that the node attribute of the device is a secondary node;
  receive a negotiation message from the second secondary node, wherein the negotiation message comprises information indicating a weight of the second secondary node, and wherein the negotiation message is sent by the second secondary node to the device when it is detected that the node attribute indicated in the broadcast message is the same as a node attribute of the second secondary node;
  send, to the second secondary node, a negotiation response message instructing to downgrade the second secondary node to a Slave node when a weight of the device is greater than or equal to the weight of the second secondary node; and
  send, to all the nodes in the first distributed cluster and the second distributed cluster, a broadcast message indicating that the device is downgraded to a Slave node when the weight of the device is less than the weight of the second secondary node.

13. A device for processing a failure in at least one distributed cluster, comprising:
  a first receiver configured to receive a first heartbeat message from a first secondary node comprising third indication information; and
  a processor coupled to the first receiver and configured to:
    determine, according to the third indication information received by the first receiver, that the first secondary node is disconnected from a first Slave node;
    detect whether a second heartbeat message from the first Slave node to the device is interrupted based on whether the second heartbeat message from the first Slave node is received between a third moment and a fourth moment, wherein the third moment is a moment at which the device receives the heartbeat message from the first secondary node comprising the third indication information, wherein the fourth moment is earlier than the third moment, wherein a time interval between the third moment and the fourth moment is N times a heartbeat period of sending the second heartbeat message by the first Slave node to the device, and wherein N is a positive integer;
    determine that the device is also disconnected from the first Slave node when the second heartbeat message from the first Slave node to the device is interrupted; and
    determine, that the first Slave node is faulty, wherein the at least one distributed cluster comprises a first distributed cluster, wherein the first distributed cluster comprises a first Master node, the first Slave node, a first reference node, and the first secondary node that serves as a backup of the first Master node, and wherein the device is the first Master node.

14. The device of claim 13, wherein the processor is further configured to:
  detect, within a preset detection period, whether the heartbeat message from the first secondary node and a heartbeat message from the first reference node are received, wherein the preset detection period is M times the heartbeat period of sending a heartbeat message, and wherein M is a positive integer; and
  determine that both the first secondary node and the first reference node are faulty when neither the heartbeat message from the first secondary node nor the heartbeat message from the first reference node is received by the processor within the preset detection period.

15. The device of claim 13, wherein the at least one distributed cluster further comprises a presecond distributed cluster, wherein the second distributed cluster comprises a second Slaveary node and a heartbeat message from, a second reference node, are second secondary node that serves as a backup of the second Master node, wherein the device further comprises a second receiver coupled to the first receiver and the processor and configured to receive a heartbeat message from the second reference node, wherein the heartbeat message from the second reference node comprises fourth indication information indicating that a node attribute of a receive end of the heartbeat message is a Slave node, wherein the second reference node is configured to separately send, to the second Slave node and all nodes in the first distributed cluster, the heartbeat message comprising the fourth indication information, wherein the second distributed cluster and the first distributed cluster have a same cluster identifier, and wherein the processor is further configured to:
- determine, according to the fourth indication information received by the second receiver, that the node attribute of the receive end of the heartbeat message indicated in the heartbeat message from the second reference node does not match a node attribute of the device;
- determine that the second distributed cluster in which the second reference node is located and the first distributed cluster in which the device is located are two sub-clusters formed after one network distributed cluster is split; and
- negotiate with the second Master node in the second distributed cluster to integrate the first distributed cluster and the second distributed cluster.

16. The device of claim 15, wherein the processor is further configured to:
- send, to all nodes in the first distributed cluster and the second distributed cluster, a broadcast message indicating that the node attribute of the device is a Master node;
- receive a negotiation message from the second Master node, wherein the negotiation message comprises information indicating a weight of the second Master node, and the negotiation message is from the second Master node to the device when it is detected that the node attribute indicated in the broadcast message is the same as a node attribute of the second Master node;
- send, to the second Master node, a negotiation response message that is used to instruct to downgrade the second Master node to a Slave node when a weight of the device is greater than or equal to the weight of the second Master node; and
- send, to all the nodes in the first distributed cluster and the second distributed cluster, a broadcast message indicating that the device is downgraded to a Slave node when the weight of the device is less than the weight of the second Master node.

* * * * *

UNITED STATES PATENT AND TRADEMARK OFFICE
CERTIFICATE OF CORRECTION

| | |
|---|---|
| PATENT NO. | : 10,560,315 B2 |
| APPLICATION NO. | : 15/674159 |
| DATED | : February 11, 2020 |
| INVENTOR(S) | : Jianqing Yuan and Shaoji Ni |

It is certified that error appears in the above-identified patent and that said Letters Patent is hereby corrected as shown below:

In the Claims

Claim 15, Column 48, Line 53: "a presecond distributed" should read "a second distributed"

Claim 15, Column 48, Lines 55-56: "Slaveary node and a heartbeat message from, a second reference node, are second secondary node" should read "Master node, a second Slave node, a second reference node, and a second secondary node"

Signed and Sealed this
Fifth Day of May, 2020

Andrei Iancu
*Director of the United States Patent and Trademark Office*